(12) United States Patent
Yu et al.

(10) Patent No.: US 9,495,299 B2
(45) Date of Patent: Nov. 15, 2016

(54) DATA PROCESSING DEVICE UTILIZING WAY SELECTION OF SET ASSOCIATIVE CACHE MEMORY BASED ON SELECT DATA SUCH AS PARITY DATA

(75) Inventors: Thomas Edison Chua Yu, Kanagawa (JP); Hajime Yamashita, Kanagawa (JP); Masayuki Ito, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 199 days.

(21) Appl. No.: 14/367,925

(22) PCT Filed: Dec. 26, 2011

(86) PCT No.: PCT/JP2011/080078
§ 371 (c)(1),
(2), (4) Date: Jun. 22, 2014

(87) PCT Pub. No.: WO2013/098919
PCT Pub. Date: Jul. 4, 2013

(65) Prior Publication Data
US 2014/0359223 A1    Dec. 4, 2014

(51) Int. Cl.
*G06F 12/00* (2006.01)
*G06F 12/08* (2016.01)
(Continued)

(52) U.S. Cl.
CPC ....... *G06F 12/0864* (2013.01); *G06F 11/1064* (2013.01); *G06F 12/126* (2013.01);
(Continued)

(58) Field of Classification Search
CPC ............... G06F 12/0864; G06F 12/126; G06F 11/1064; G06F 12/127; G06F
(Continued)

(56) References Cited

U.S. PATENT DOCUMENTS 5,666,513 A    9/1997  Whittaker
6,708,294 B1   3/2004  Nakao et al.
(Continued)

FOREIGN PATENT DOCUMENTS

CN    1704911 A    12/2005
CN    101681258 A    3/2010
(Continued)

OTHER PUBLICATIONS

Partial Supplementary European Search Report issued Jul. 16, 2015, in European Patent Application No. EP11878346.3.
(Continued)

*Primary Examiner* — John A Lane
(74) *Attorney, Agent, or Firm* — Shapiro, Gabor and Rosenberger, PLLC

(57) ABSTRACT

Part of a plurality of ways are selected from among the ways according to a value of select data created based on tag address information which is part of address information, and cache tags are read. Further, when performing cache fill, the cache memory performs the cache fill on a cache entry selected from part of the ways according to the value of the select data. For select data used for selecting a way, e.g. parity data in connection with tag address information is used. A way to read a cache tag from is selected based on a value of parity data and further, the way of a cache entry to perform cache fill on is selected.

16 Claims, 19 Drawing Sheets

(51) Int. Cl.
*G06F 12/12* (2016.01)
*G06F 11/10* (2006.01)

(52) U.S. Cl.
CPC ..... *G06F 12/127* (2013.01); *G06F 2212/1028* (2013.01); *G06F 2212/6032* (2013.04); *Y02B 60/1225* (2013.01)

(58) Field of Classification Search
CPC ................ 2212/6032;G06F 2212/1028; Y02B 60/1225
See application file for complete search history.

(56) References Cited

U.S. PATENT DOCUMENTS

| | | |
|---|---|---|
| 2002/0112126 A1 | 8/2002 | Hayakawa et al. |
| 2005/0268041 A1 | 12/2005 | Yoshioka |
| 2007/0271416 A1 | 11/2007 | Ahmed |
| 2008/0040576 A1 | 2/2008 | Stempel et al. |
| 2010/0017567 A1 | 1/2010 | Fujisawa |
| 2010/0064181 A1* | 3/2010 | Moyer ................ G06F 11/1064 714/48 |
| 2013/0055011 A1* | 2/2013 | Sivaramakrishnan G06F 11/1064 714/6.21 |

FOREIGN PATENT DOCUMENTS

| | | |
|---|---|---|
| CN | 101620572 B | 1/2011 |
| CN | 101443740 B | 12/2012 |
| EP | 0 997 821 A1 | 5/2000 |
| EP | 1 231 539 A2 | 8/2002 |
| JP | 04-205449 A | 7/1992 |
| JP | 07-168760 A | 7/1995 |
| JP | 2000-132460 A | 5/2000 |
| JP | 2002-236616 A | 8/2002 |
| JP | 2010-26716 A | 2/2010 |
| WO | WO 02/08911 A1 | 1/2002 |

OTHER PUBLICATIONS

Extended European Search Report issued Nov. 6, 2015, in European Patent Application No. EP11878346.3.

Office Action issued Apr. 22, 2016, in Chinese Patent Application No. 201180075908.3.

* cited by examiner

Fig.13

| V | L | Virtual CPU ID | Logical Address[31:12] |
|---|---|---|---|

$\left(\begin{array}{l}\text{V: VALID BIT}\\\text{L: LOCK BIT}\end{array}\right)$

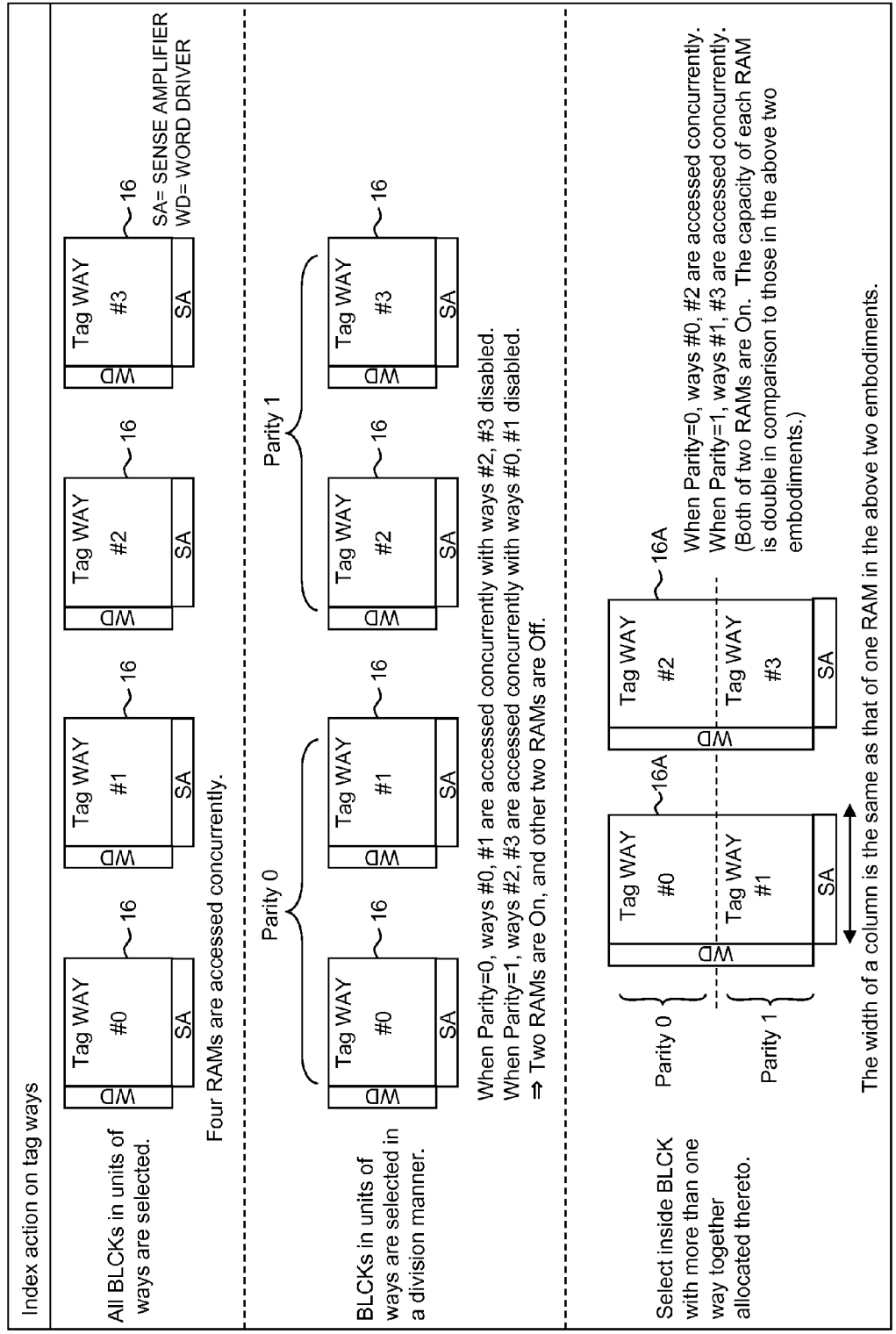

DATA PROCESSING DEVICE UTILIZING WAY SELECTION OF SET ASSOCIATIVE CACHE MEMORY BASED ON SELECT DATA SUCH AS PARITY DATA

TECHNICAL FIELD

The present invention relates to a data processing device including a set associative type cache memory, and a technique useful in application to e.g. a microcomputer.

BACKGROUND ART

In order to enable a high-speed access by CPU to operand data and a command, a cache memory is disposed between a work memory of large capacity and CPU. A set associative type cache memory (hereinafter referred to as "set associative type cache memory", simply) has been used as a cache memory by which a relatively high cache hit rate can be achieved even with a relatively small circuit scale. A set associative type cache memory has a structure which allows different tags of data to be stored for the same cache entry. Supposing that the cache memory includes pairs of tag ways and data ways, and cache entries of those ways are composed of e.g. 256 kinds of entries, a cache entry of each way is selected according to a piece of index address information of low-order side 8 bits of a piece of address information. In a tag way, a piece of tag address information of more than one bit on a high-order side of the piece of index address information is stored as a cache tag for each cache entry indicated by an index address. In a data way, data of an address specified by corresponding index address information and tag address information are stored each cache entry indicated by an index address. In read access or write access by CPU, all of tag ways according to a piece of index address information of the access address are read; in case that the cache tag thus read matches with tag address information in the access address information, a corresponding cache entry of the data way which forms a pair with the tag way concerned will be made a target for an operation of the data read or data write. What is described here on a set associative type cache memory has been widely known.

As representatively described above, on a cache memory having a plurality of tag ways, a readout of cache tags from all of the tag ways at a time, and a quick judgment on the match or mismatch between a cache tag and a tag address are performed; in such case, the power consumption is increased because all the tag ways are activated in parallel. In this regard, an attempt is made to realize the reduction in power consumption by making possible to switch between a direct map format and a set associative format in Patent Document 1. In addition, in Patent Document 2, arrangement is made so that the division number of ways is set, and the ways are accessed in order, thereby eliminating the need for an action of parallel index to the ways.

Also, in regard to a cache memory, a bit inversion error (soft error) in which stored information thereof is undesirably inverted under the influence of cosmic rays (alpha rays, and beta rays) or the like can be caused. Such a bit inversion error can be detected by use of a parity bit. Especially, in Patent Document 3 in which a parity check is used, the need for a parity check circuit for each memory array is eliminated by performing a parity check on access address data, whereby an attempt to realize a lower power consumption by decrease in the number of parity check circuits is made.

PRIOR ART DOCUMENT

Patent Document

[Patent Document 1] JP-A-2002-236616
[Patent Document 2] JP-A-2010-26716
[Patent Document 3] JP-A-2000-132460

DISCLOSURE OF THE INVENTION

Problems that the Invention is to Solve

According to the study by the inventor concerning the reduction in power consumption in connection with a set associative type cache memory, in the case of Patent Document 1, a cache hit rate must be sacrificed if the direct map format is selected to reduce the power consumption. In the case of Patent Document 2, it is obliged to experience the delay in cache memory action. In the case of Patent Document 3, the reduction in power consumption is realized by decreasing the number of parity check circuits, and no promise is shown for more than that.

Further, according to the study by the inventor concerning the reduction in the circuit scale for detecting a bit inversion error in connection with a set associative type cache memory, technology described in Patent Document 3 just determines whether or not there is an error in an access request address, and it is impossible to expect the reduction in a circuit operable to detect a bit inversion error in data held by a way. In Patent Document 1, a parity check for an undesirable bit inversion error is not taken into account. In Patent Document 2, error detection for the timing of transmission of data read out of a data array is taken into account, but the detection of an undesirable bit inversion error in data held by a way is not considered.

It is an object of the invention to achieve low power consumption without sacrificing a cache entry select action speed from the standpoint of selecting a way in a set associative type cache memory.

It is another object of the invention to reduce the scale of a circuit operable to detect a bit inversion error in away in a set associative type cache memory.

The above and other objects of the invention and novel features thereof will become apparent from the description hereof and the accompanying drawings.

Means for Solving the Problems

A representative embodiment of the invention disclosed in the application will be described briefly below.

That is, the cache memory selects part of the ways from among a plurality of ways according to a value of select data created based on tag address information which is part of address information, and reads cache tags. Further, when performing cache fill, the cache memory performs the cache fill on a cache entry selected from part of the ways according to the value of the select data.

For instance, parity data in connection with tag address information is used as the select data used for way selection; the selection of a way to read a cache tag from based on the value of the parity data and in addition, the selection of a way where a cache entry to perform cache fill on is present are performed.

Effects of the Invention

The effects achieved by the representative embodiment of the invention disclosed in the application will be described briefly below.

That is, it is possible to achieve low power consumption without sacrificing a cache entry select action speed from the standpoint of selecting a way in a set associative type cache memory.

It is possible to reduce the scale of a circuit operable to detect a bit inversion error in a way in a set associative type cache memory.

BRIEF DESCRIPTION OF THE DRAWINGS

FIG. 13 It is an explanatory diagram showing, by example, the structure of a tag entry in a case in which a virtual CPU number (Virtual CPU ID) for processing each thread is the information α in performing a process by means of the multi-thread.

FIG. 22 It is an explanatory diagram showing a chief embodiment of the form of an index action on tag ways in summary.

DESCRIPTION OF EMBODIMENTS

1. Summary of the Embodiments

Figure 1:
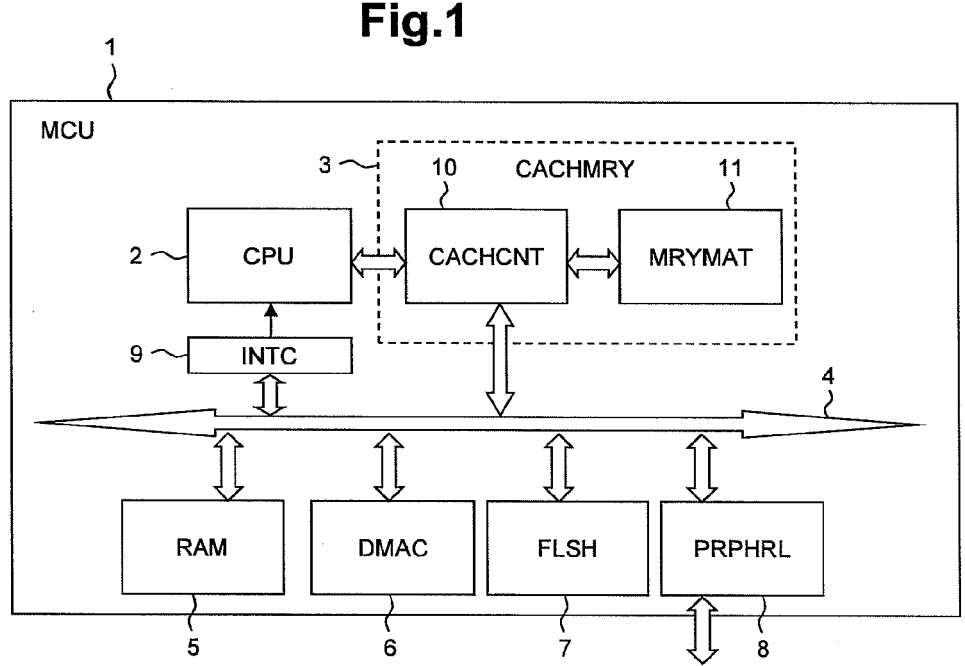
FIG. 1 It is a block diagram showing, by example, a microcomputer as one embodiment of the data processing device.

First, summary of representative embodiments of the invention disclosed in the application will be described. Reference numerals in drawings in parentheses referred to in description of the summary of the representative embodiments just denote components included in the concept of the components to which the reference numerals are designated.

[1] <Selecting Part of the Ways Based on Address Information>

A data processing device (1) according to the representative embodiment of the invention includes a set associative type cache memory (3) which stores cache entries in a plurality of ways. When reading a cache tag, the cache memory selects, from among the plurality of ways (12, 13), part of the ways according to a value of select data (PRTdat) generated based on tag address information (TAGadrs) forming part of address information, and reads cache tags from the selected ways by use of an index address in the address information. Further, when performing cache fill, the cache memory performs the cache fill on a cache entry (14) selected from part of the ways according to the value of the select data.

According to this, when reading a cache tag, it is sufficient to select just some tag ways according to the value of the select data and to index a cache tag out of them, which contributes to a low power consumption because it is unnecessary to cause all the tag ways to work in parallel. As to a cache entry targeted for cache fill, it is made a cache entry belonging to the way indicated by select data and as such, the correspondence between a way having a cache tag to read in an action of cache and a way selected according to the select data can be kept readily, whereby the low power consumption is ensured.

[2] <Parity Data Used as Select Data>

In the data processing device as described in the item 1, the cache memory creates parity data (PRTdat) in connection with tag address information which is part of the address information, and uses the parity data as the select data.

According to this, further, at least parity data which restricts a range of ways to be used will be used for cache entry replacement. Accordingly, assuming that a piece of address information to be supplied to the cache memory has no error, a target for cache tag read is a way depending on the value of parity data in connection with the address information and as such, it is not necessary to save a parity bit corresponding to a cache entry. Therefore, a circuit operable to create parity data for comparison from a read cache tag is not required, and a malfunction in which a bit-inverted cache tag is processed as a proper cache tag by mistake can be suppressed. That is, even if a bit inversion such that the value of parity data is inverted is caused in a cache tag, the way where the bit-inverted cache tag exists is not targeted for indexing because it does not make a proper way according to the value of parity data. Thus, the number of parity generation circuits can be reduced by half while increasing the reliability in connection with a cache tag bit inversion. In addition, a lower power consumption can be also achieved because the number of parity generation circuits can be halved.

[3] <Cache Error in the Event of More than One Hit>

In the data processing device as described in the item 1, the cache memory compares each of the cache tags read from the ways with the tag address, determines whether a result of the comparison fits All mismatched, Just one matched or More than one matched and if the determination results in More than one matched, generates a cache error signal (41).

According to this, a mismatch with a tag address owing to the bit inversion of a cache tag may be handled in the same way as a typical cache miss is. Even if a cache entry having a cache tag which is the same as a proper cache tag apparently arises owing to inversion of more than one bit of a cache tag, such an abnormality can be handled by the determination of More than one matched.

[4] <Cache Error Processed as a Cause of Exception or a Cause of Interrupt>

The data processing device as described in the item 3 further includes an interrupt controller (9) to which the cache error signal is input as a cause of exception or a cause of interrupt.

According to this, it becomes possible to flexibly perform a process according to the situation through an interrupt process or exception process in case that the influence of bit inversion on the occurrence of such a cache error is regarded as having increased.

[5] <Cache Entry Subjected to Data Manipulation>

In the data processing device as described in the item 3, the cache memory subjects a cache entry of a cache tag involved with the comparison result of Just one matched to data manipulation.

According to this, it is possible to readily transfer to data manipulation of a cache entry in response to a typical cache hit.

[6] <Activation/Inactivation Control on Memory Blocks in Ways>

In the data processing device as described in the item 1, the ways have tag ways (12) for storing the cache tag corresponding to the index address and data ways (13) for storing data corresponding to the index address. The cache entry includes the cache tag and data corresponding thereto, and the tag ways are each constituted by a memory block (16) whose activation or inactivation is selected for each tag way respectively. When reading a cache tag, the cache memory selects the some tag ways by memory block activation by use of the select data.

According to this, low power consumption can be achieved by selective inactivation on memory blocks in tag ways.

[7] <Parity Data of One Bit>

In the data processing device as described in the item 6, the select data is parity data PRTdat of one bit for all of bits of tag address information which is part of the address information, and the parity data of a first logical value is used for selecting half of the memory blocks, and the parity data of a second logical value is used for selecting the remaining half of the memory blocks.

According to this, a power consumption required for reading cache tags for address comparison can be reduced by half approximately.

[8] <Parity Data of More than One Bit>

In the data processing device as described in the item 6, the select data is parity data (PRTdat[1:0]) of more than one bit composed of parity bits each consisting of a division of tag address information which is part of the address information, and a value of the parity data decides a tag way to select from among tag ways.

According to this, a power consumption required for reading cache tags for address comparison can be further reduced by a relatively simple structure.

[9] <Turning on/Off the Function of Selecting a Tag Way to Index>

In the data processing device as described in the item 6, the cache memory has a first mode (PBS=on) for selecting some tag ways from among the tag ways according to the select data to read a cache tag, and a second mode (PBS=off) for making all the tag ways tag ways to read a cache tag from, and accepts input of a mode-select signal (MOD) for selecting the first mode or the second mode.

According to this, a degree of freedom as a first mode is set in case that it is desired to put priority on the low power consumption, and a second mode is set in case that it is desired to put priority on a high cache hit rate can be realized by a minimum change in configuration in comparison to the circuit configuration which enables only a first mode because it premises the one-way and one-memory block structure.

[10] <Activation/Inactivation Control on a Memory Block with More than One Way>

In the data processing device as described in the item 1, the way has a tag way for storing the cache tag corresponding to the index address and a data way for storing data corresponding to the index address. A cache entry includes the cache tag and data corresponding thereto. The tag ways are allocated together in groups of a given plural number to one memory block (16A), and tag ways arranged on the same memory block are selected according to select data different from each other. When reading a cache tag, the cache memory uses the select data and the index address information to read cache tags.

According to this, tag ways which are not selected concurrently are together allocated to one memory block and therefore, the numbers of sense amplifiers and buffer amplifiers which one memory block includes are equal to those of a memory block having one tag way approximately; a leak current such as a sub-threshold leak current in an inactivation state reduces in proportion to a decrease in the total number of memory blocks. In this regard, it is possible to make contribution to a lower power consumption in some cases.

[11] <Parity Data of One Bit>

In the data processing device as described in the item 10, the select data is parity data (PRTdat) of one bit for all of bits of tag address information which is part of the address information. The parity data of a first logical value is used to select one tag way in each of the memory blocks. The parity data of a second logical value is used to select the other tag way in each of the memory blocks.

According to this, the power consumption required for reading out cache tags for address comparison can be reduced by half approximately.

[12] <Parity Data of More than One Bit>

In the data processing device as described in the item 10, the select data is parity data (PRTdat[1:0]) of more than one bit composed of parity bits each consisting of a division of tag address information which is part of the address information, and a value of the parity data decides a tag way to select from among individual memory blocks.

According to this, a power consumption required for reading cache tags for address comparison can be further reduced by a relatively simple structure.

[13] <LRU Data Array>

In the data processing device as described in the item 1, the cache memory has an LRU data array (15, 15A) for storing LRU data (LRU[1:0] and LRU[2:0]) used as an index to identify a cache entry targeted for cache fill by a pseudo LRU when deciding a cache entry to perform cache fill on. The LRU data array has a region for storing history data of more than one bit showing, for each index address to a cache entry, a history of use of each group of part of the ways selected according to select data. The cache memory selects a cache entry to perform cache fill on based on the history data read from an LRU data array by use of index address information, and corresponding select data.

According to this, select data is used together with history data in selecting a cache entry to perform cache fill on and as such, the number of bits of history data can be reduced by the number of bits of select data, which contributes to the reduction in circuit scale of an LRU data array and the reduction in power consumption therein.

[14] <LRU Corresponding to Memory Blocks in Ways>

In the data processing device as described in the item 13, the plurality of ways are each constituted by a memory block (16) whose activation or inactivation is selected for each tag way. When reading a cache tag, the cache memory selects the some ways by memory block activation by use of the select data according to the select data. When performing the cache fill, the cache memory selects, of cache entries indicated by the index address in each memory block, a cache entry to perform cache fill on according to the history data (LRU[1:0]) of more than one bit read from the LRU data array (15) based on index address information, and the select data (PRTdat) created based on the tag address.

According to this, a value of history data may be decided according to a value of the select data when storing the history data; which memory block to activate for an indexed history data value may be decided by a value of select data at that time. The address information used for selecting a cache entry from an activated memory block may be only index address information.

[15] <LRU Corresponding to a Memory Block in Groups of Ways>

In the data processing device as described in the item 13, the plurality of ways are allocated together in groups of a given plural number to one memory block (16A), and ways arranged on the same memory block are selected according to select data different from each other. When reading a cache tag, the cache memory is given a direction on which way to select in the activated memory blocks by the select data, and a direction on which cache tag to select in the directed way by index address information in the address information. When performing cache fill, the cache memory is given a direction on which memory block to select by history data (LRU[2:0]) of more than one bit read from the LRU data array (15A) according to index address information, a direction on which way to select from the directed memory block by the select data (PRTdat), and a direction on which cache entry in the directed way to subject to cache fill by the index address (IDXadrs).

According to this, a value of history data may be decided according to a value of select data when storing history data; which cache entry of which memory block to select for a value of indexed history data may be decided by a value of select data, and index address information at that time.

[16] <Selecting a Way by Use of Parity Data>

A data processing device (1) according to another embodiment of the invention includes a set associative type cache memory (3) which stores cache entries in a plurality of ways. When reading a cache tag, the cache memory is given a direction on which part of the ways to select from the plurality of ways according to a value of parity data (PRTdat) created based on tag address information (TAGadrs) which is part of address information, and a direction on which cache tag in the directed way to read by index address information in the address information. The cache memory compares the read cache tags with the tag address, determines whether a result of the comparison fits All mismatched, Just one matched or More than one matched and if the determination results in More than one matched, generates a cache error signal (41). When performing cache fill, the cache memory performs cache fill on a cache entry selected from part of the ways according to the value of select data.

According to this, the correspondence between a way having a cache tag to read in an action of cache and a way selected according to the select data can be kept readily, which contributes to low power consumption as in the item 1. Further, as in the item 2, it is not required to save parity bits corresponding to cache entries, and the number of parity generation circuits can be reduced by half while increasing the reliability in connection with a cache tag bit inversion. In addition, as in the item 3, a cache tag bit inversion resulting in a mismatch with a tag address may be coped with in the same way as a typical cache miss is. Even in case that a cache entry having the same cache tag as a proper cache tag apparently has arisen owing to cache tag bit inversions, such an abnormality can be coped with by making the determination of More than one matched.

[17] <Selecting a Way by Parity Data>

A data processing device (1) according to still another embodiment of the invention includes a set associative type cache memory (3) which stores cache entries in a plurality of ways. When reading a cache tag, the cache memory is given a direction on which part of the ways to select from the plurality of ways according to a value of parity data (PRTdat) created based on tag address information (TAGadrs) which is part of address information, and a direction on which cache tag in the directed way to read by index address information (IDXardrs) in the address information. The cache memory compares the read cache tag with the tag address, determines whether a result of the comparison fits All mismatched, Just one matched or More than one matched and if the determination results in More than one matched, generates a cache error signal (41). The cache memory has an LRU data array (15, 15A) for storing LRU data (LRU[1:0], LRU[2:0]) used as an index to identify a cache entry targeted for cache fill by a pseudo LRU when deciding a cache entry to perform cache fill on. The LRU data array has a region for storing history data of more than one bit showing, for each index address to a cache entry, a history of use of each part of the ways selected according to parity data. The cache memory selects a cache entry to perform cache fill on based on the history data read from an LRU data array by use of index address information, and corresponding select data.

According to this, the correspondence between a way having a cache tag to read in an action of cache and a way selected according to the select data can be kept readily, which contributes to low power consumption as in the item 1. Further, as in the item 2, it is not required to save parity bits corresponding to cache entries, and the number of parity generation circuits can be reduced by half while increasing the reliability in connection with a cache tag bit inversion. In addition, as in the item 3, a cache tag bit inversion resulting in a mismatch with a tag address may be coped with in the same way as a typical cache miss is. Even in case that a cache entry having the same cache tag as a proper cache tag apparently has arisen owing to cache tag bit inversions, such an abnormality can be coped with by making the determination of More than one matched. Further, as in the item 13, select data is used together with history data in selecting a cache entry to perform cache fill on and as such, the number of bits of history data can be reduced by the number of bits of select data, which contributes to the reduction in circuit scale of an LRU data array and the reduction in power consumption therein.

[18] <Selecting a Cache Entry Targeted for Manipulation from Among Part of the Ways>

A data processing device (1) according to still another embodiment of the invention includes a set associative type cache memory (3) using a plurality of ways for storing cache entries. When manipulating the ways based on address information, the cache memory selects a cache entry targeted for the manipulation from among part of the ways depending on select data (PRTdat) created based on tag address information (TAGadrs) which is part of the address information.

According to this, a cache entry targeted for manipulation for cache tag read or cache fill may be selected from part of the ways depending on a value of select data and as such, it is not required to cause all the ways to work in parallel, which contributes to low power consumption. Since a cache entry targeted for manipulation is selected by use of select data, the correspondence between a way to read a cache tag from and a way targeted for cache fill can be maintained readily.

[19] <Selecting a Cache Entry Targeted for Cache Tag Read or Cache Fill from Among Part of the Ways>

A data processing device (1) according to still another embodiment of the invention includes a set associative type cache memory (3) using a plurality of ways for storing cache entries. The cache memory reads cache tags to compare with an address tag from part of the ways depending on select data created based on tag address information (TAGadrs) which is part of address information, and selects a cache entry to perform cache fill on.

According to this, a cache entry targeted for manipulation for cache tag read or cache fill may be selected from part of the ways depending on a value of select data and as such, it is not required to cause all the ways to work in parallel, which contributes to low power consumption. Since a cache entry targeted for manipulation is selected by use of select data, the correspondence between a way to read a cache tag from and a way targeted for cache fill can be maintained readily.

[20] <Selecting a Way to Read a Cache Tag from by Use of Select Data, and Selecting a Cache Entry to Perform Cache Fill on According to a History of Use>

A data processing device (1) according to still another embodiment of the invention includes a set associative type cache memory (3) using a plurality of ways for storing cache entries. When reading a cache tag, the cache memory is given a direction on which way to select in the plurality of ways according to a value of select data (PRTdat) created based on tag address information (TAGadrs) which is part of address information, and a direction on which cache tag to read from the directed ways by an index address (IDXadrs) in the address information. When performing cache fill, the cache memory selects a cache entry to perform cache fill on according to a combination of a history of use (LRU[1:0], LRU[2:0]) concerning cache entries of all the ways to which reference is made in units of index addresses, and a value of select data (PRTdat).

According to this, a cache entry targeted for manipulation for cache tag read or cache fill may be selected from part of the ways depending on a value of select data and as such, it is not required to cause all the ways to work in parallel, which contributes to low power consumption. Since a cache entry targeted for manipulation is selected by use of select data, the correspondence between a way to read a cache tag from and a way targeted for cache fill can be maintained readily. Further, select data is used together with history data in selecting a cache entry to perform cache fill on and as such, the number of bits of history data can be reduced by the number of bits of select data, which, in this regard, contributes to the reduction in the scale of a circuit which holds history data, and the reduction in power consumption therein.

2. Further Detailed Description of the Embodiments

The embodiments will be described further in detail. In all the drawings for explanation of the forms for carrying out the invention, elements having like functions are identified by the same reference numerals, and the iteration of the explanations thereof is omitted.

<<1. Microcomputer>>

FIG. 1 shows, by example, a microcomputer (MCU) 1 as one embodiment of the data processing device. Although no special restriction is intended, the microcomputer 1 shown in the drawing is formed on a semiconductor substrate such as monocrystalline silicon by CMOS integrated circuit manufacturing techniques.

Although no special restriction is intended, the microcomputer 1 has a CPU (Central Processing Unit) 2 which fetches and decrypts a command, fetches a required operand data according to a result of the decryption and performs an arithmetic calculation process. In the drawing, the CPU 2 is shown as if it is one of single core. However, it is needless to say that the CPU may be formed in a multicore structure. In addition, the program-execution form of the CPU 2 is arranged to be applicable to not only a single thread, but also a multi-thread; such an application may be any of the case of processing one program according to a multi-thread, and the case of processing more than one program by a thread which is a program unit according to the multi-thread on the whole.

The numeral 3 denotes a cache memory (CACHMRY), which is disposed between an internal bus 4 and the CPU 2. In the drawing, a command executed by the CPU, and data including an operand and calculation data which are used in execution of the command are primarily put in the cache memory 3 all together. To the internal bus 4, an interrupt controller (INTC) 9, a RAM 5 including a static random access memory (SRAM), a direct memory access controller (DMAC) 6, an electrically rewritable flash memory (FLASH) 7, and other peripheral circuits (PRPHRL) 8 are connected, which are shown representatively. The other peripheral circuits 8 include a timer and an input/output port to outside the microcomputer 1. Although no special restriction is intended, the RAM 5 and FLSH 7 are used to store a program and data, and those are targeted for caching by the cache memory 3, for example.

Although no special restriction is intended, the cache memory 3 has a cache control circuit (CACHCNT) 10, and a memory mat (MRYMAT) 11, whereby the function of a set associative type cache memory is materialized.

Figure 2:
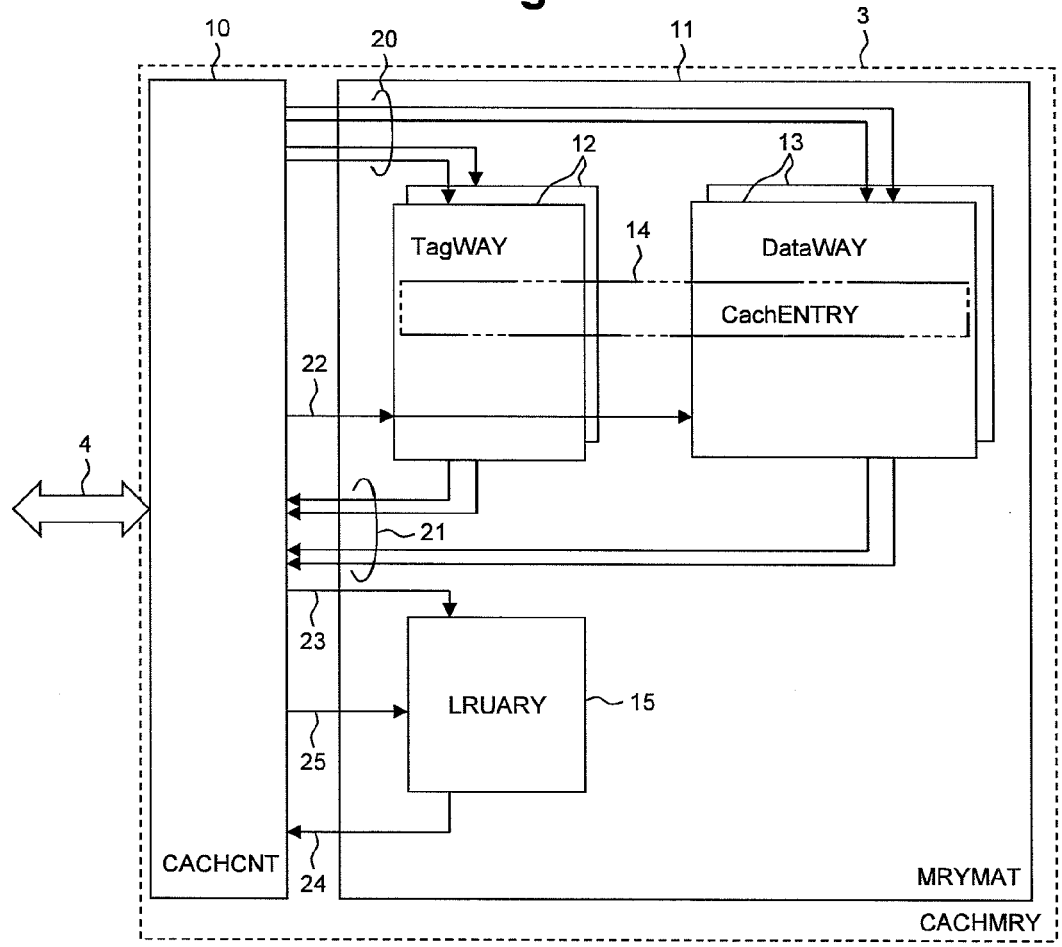
FIG. 2 It is a block diagram showing, by example, a schematic configuration of a memory mat in a case in which a function of a set associative type cache memory is materialized.

FIG. 2 shows, by example, the schematic configuration of a memory mat 11 in the case of materializing the function of a set associative type cache memory. A set associative type cache memory has a plurality of ways, which have tag ways (TagWAY) 12 and data ways (DataWAY) 13; more than one cache entry (CachENTRY) 14 is formed on each way. The tag way (TagWAY) 12 has e.g. a cache tag, a valid bit and a lock bit for each cache entry 14. The data way (DataWAY) 13 has cache data (a program executed by CPU, and an operand data used by CPU) corresponding to a cache tag for each cache entry 14.

Here, 4-way set associative type cache memory is taken as an example, in which one data way (DataWAY) 14 has 16-byte cache data, and the number of cache entries (CachENTRY) 14 is 256 entries. In this case, of bits of address information created by the CPU 2, the least significant 4 bits make a piece of offset address information to select 32 bits (4 bytes) from cache data of one data way (DataWAY) 13, 8 bits on its high-order side make a piece of index address information to select one cache entry (CachENTRY) 14, and its higher order side makes a piece of tag address information. For a cache tag, a piece of tag address information according to cache data of a corresponding cache entry 14 is used.

The LRU data array (LRUARY) 15 has history data used as an index to select a cache entry (CachENTRY) 14 to be replaced. The history data is a piece of information to pinpoint, of cache entries having the same index address, the one which has not been used recently. In this embodiment, the LRU data array (LRUARY) 15 has 256 history data, and the history data are accessed according to a piece of index address information.

In FIG. 2, 20 denotes a write path of a cache entry 14, and 21 denotes a read path of a cache entry. "22" denotes a select path for selecting a way to the tag way 12 and the data way 13, and making an index to the way to be selected. "23" denotes a write path of history data to the LRU array 15, 24 denotes a read path of history data, and 25 denotes a select path of history data.

While the cache memory 3 has a parity function to tag ways, the simplification of the circuit scale and the low power consumption are taken into account in addition of the function. The detail of the cache memory will be described below on this point.

<<2. Parity Function to Tag Ways>>

Figure 3:
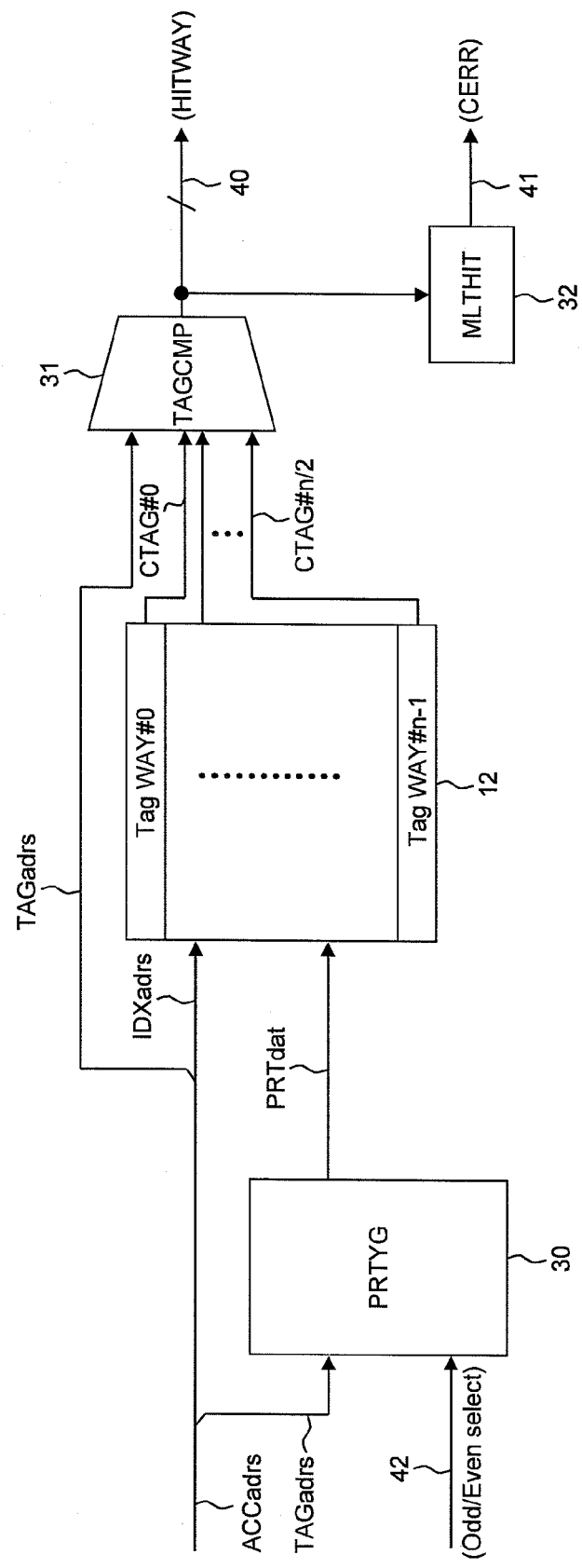
FIG. 3 It is a block diagram showing, by example, a basic configuration of a parity function for a tag way of a cache memory.

FIG. 3 shows, by example, a basic configuration of the parity function to tag ways of the cache memory. Attention is directed at n tag ways TagWAY#0 to TagWAY#n−1 in an n-way set associative type cache memory here.

ACCadrs denotes a piece of access address information created by CPU. TAGadrs denotes a piece of tag address information included in the access address information ACCadrs, and IDXadrs denotes a piece of index address information included in the access address information ACCadrs. For instance, the parity generation circuit (PRTYG) 30, the tag comparison circuit (TAGCMP) 31 and the multi-hit detection circuit (MLTHIT) 32 which are shown in the drawing are configured by the cache control circuit 10.

The parity generation circuit 30 creates, for example, a parity bit of one bit for all the bits of tag address information TAGadrs as parity data PRTYdat. Which of even and odd parities to use is specified by an even-odd select signal (ODSEL) 42. Specifically, in the case of the even-odd select signal 42 having the logical value 1, the parity generation circuit performs an exclusive-OR EXOR on all the bits of tag address information TAGadrs, and then outputs parity data PRTdate of the logical value 0 on condition that the number of logical value 1s in all the bits is an even number, and outputs parity data PRTdate of the logical value 1 on condition that the number of logical value is in all the bits is an odd number. In the case of the even-odd select signal 42 having the logical value 0, the parity generation circuit performs an exclusive NOR EXNOR on all the bits of tag address information TAGadrs, and then outputs parity data PRTdate of the logical value 1 on condition that the number of logical value 1s in all the bits is an even number, and outputs parity data PRTdate of the logical value 0 on condition that the number of logical value 1s in all the bits is an odd number.

Such parity data PRTdat are supplied to tag ways 12. The parity data PRTYdat of the logical value 1 gives a direction for selecting a group of odd-numbered tag ways TagWAY#1, TagWAY#3, . . . , whereas the parity data PRTYdat of the logical value 0 gives a direction for selecting a group of 0- and even-numbered tag ways TagWAY#0, TagWAY#2, . . . . Therefore, when performing the cache fill, the cache fill is performing on a cache entry selected from among tag ways of one group depending on the value of parity data PRTdat. In addition, when reading a cache tag, of the tag ways TagWAY#0 to TagWAY#n−1, the action on tag ways of one group depending on the value of parity data PRTdat is selected, and a cache tag is read from inside the selected ways by use of an index address IDXadrs. For instance, on condition that the number of ways is two, the tag way TagWAY#0 of one group is utilized for the parity data PRTdat of the logical value 0, and the tag way TagWAY#1 of the other group is utilized for the parity data PRTdat of the logical value 1.

According to this, when reading a cache tag, it is sufficient to select only some tag ways according to the value of parity data PRTdata, and then index cache tags therefrom; it is not necessary to activate all the tag ways in parallel and the low power consumption is materialized in this respect. In this time, a cache entry targeted for cache fill is also a cache entry belonging to a way depending on the value of the parity data PRTda and as such, the correspondence between a way having a cache tag to be read in the action of cache and a way selected according to parity data PRTda is maintained and thus, the low power consumption is ensured.

Further, at least parity data PRTdat which restricts a range of ways to be used will be used for cache entry replacement in cache fill. Assuming that a piece of access address information ACCadrs to be supplied to the cache memory 3 has no error, a target for cache tag read is a way depending on the value of parity data PRTdat in connection with its tag address information TAGadrs and as such, it is not necessary to save a parity bit corresponding to a cache entry (CashENTRY) 14. Therefore, a circuit operable to create parity data for comparison from a read cache tag is not required, and a malfunction in which a bit-inverted cache tag is processed as a proper cache tag by mistake can be suppressed. That is, even if a bit inversion such that the value of parity data is inverted is caused in a cache tag, the way where the bit-inverted cache tag exists is not targeted for indexing because it does not make a proper way according to the value of parity data PRTdat. Thus, the number of parity generation circuits can be reduced by half while increasing the reliability in connection with a cache tag bit inversion. A lower power consumption can be also achieved because the number of parity generation circuits can be halved.

The n/2 cache tags output from one group of tag ways of the tag ways TagWAY#0 to TagWAY#n−1 according to the value of parity data PRTdat, or the n/2 cache tags output from the other group are shown as CTAG#0 to CTAG#n/2 in the drawing. The output cache tags CTAG#0 to CTAG#n/2 are compared with a tag address TAGadrs in the tag comparison circuit 31, which associates results of the comparison with corresponding tags way and outputs signals (hit-way discriminant signals: HITWAY) 40 showing comparison results, match or mismatch, etc. The hit-way discriminant signals 40 are supplied to the multi-hit detection circuit 32 and in parallel, used to select a cache entry indexed for a data way involved in a hit, which is not shown in FIG. 3. The multi-hit detection circuit 32 determines, based on the hit-way discriminant signals 40, whether a result of the comparison fits All mismatched, Just one matched or More than one matched and if the determination results in More than one matched, generates a cache error signal (CERR) 41. The determination result of All mismatched means a cache miss, and the determination result of Just one matched means a cache hit.

By generating the hit-way discriminant signal 40 and the cache error signal 41, a mismatch making a result of the comparison with a tag address owing to a cache tag bit inversion can be dealt with in the same way as is a typical cache miss. Further, even in case that a cache entry having the same cache tag as a proper cache tag arises apparently owing to cache tag bit inversions, it is possible to deal with such an abnormality by making the determination of More than one matched. For instance, providing the interrupt controller 9 with the cache error signal 41 as a cause of exception or a cause of interrupt, it is possible to perform a process through an interrupt process or exception process by the CPU 2 according to the situation flexibly in case that the influence of such bit inversions on the occurrence of a cache error is regarded as becoming larger.

<<3. Selecting a Memory Block for Each Way by Parity Data>>

The activation/inactivation control performed on a memory block for each way by use of parity data will be described here.

Figure 4:
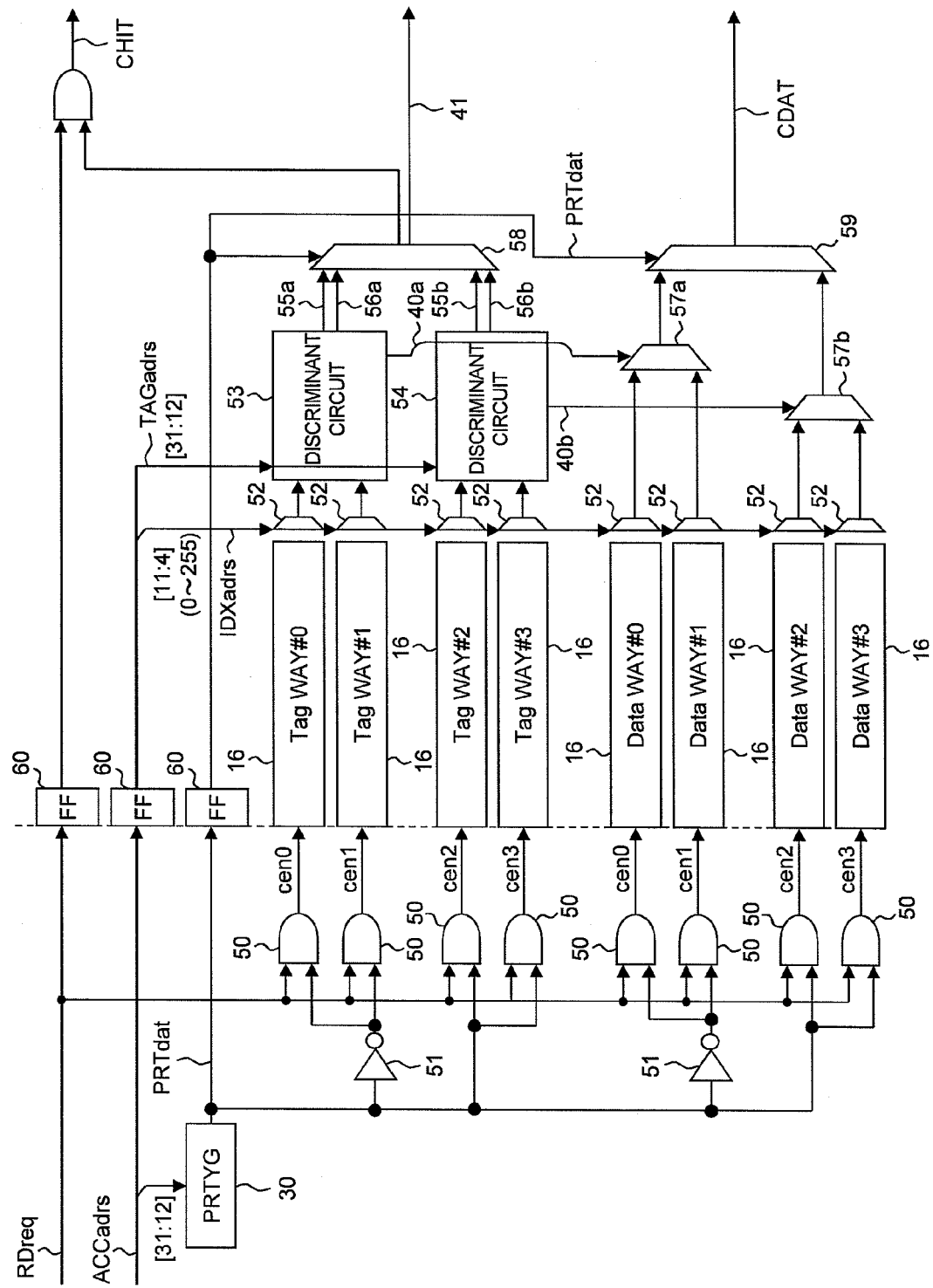
FIG. 4 It is a block diagram representatively showing a configuration focusing on a system for a read action on a cache entry.

FIG. 4 representatively shows a configuration focusing on a system for a read action on a cache entry. The configuration of a 4-way set associative type cache memory is taken as an example, in which cache entries in each way are composed of 256 entries, and one line of a data way is made up of 16 bytes.

In the example, tag ways TagWAY#0 to TagWAY#3 for storing the cache tag in corresponding to an index address IDXadrs, and data ways DataWAY#0 to DataWAY#3 for storing data corresponding to the index address IDXadrs are constituted by memory blocks 16 which are selected for activation or inactivation in units of tag and data ways. "cen0" to "cen3" denote enable signals (block-enable signals) to the memory blocks 16 of the respective ways; the internal circuits of the memory blocks 16 are enabled to work by activating (e.g. turning to High level) the corresponding block-enable signals cen0 to cen3. For instance, it is made possible, the addressing in response to an input address signal, and a sense-amplification action on read data are enabled by activating the corresponding block-enable signals cen0 to cen3. On condition that the parity data PRTdat is the logical value 0 (Low level) when a direction for read is given by a read-request signal RDreq of High level, one way group including the tag ways TagWAY#0 and TagWAY#1 and the data ways DataWAY#0 and DataWAY#1 is activated. In contrast, on condition that the parity data PRTdat is the logical value 1 (High level) when a direction for read is given by a read-request signal RDreq of High level, the other way group including the tag ways TagWAY#2 and TagWAY#3, and data ways DataWAY#2 and DataWAY#3 is activated. "50" denotes an AND gate, and "51" denotes an inverter.

The ways of the activated way group are indexed by index address information IDXadrs, from which a cache entry is selected. What is denoted by 52 conceptually represents a select circuit which decodes a piece of index address information IDXadrs and selects a corresponding cache line, and is described in reference to the other drawings on the assumption that the functions are included in each way. The discriminant circuits 53 and 54 compare a cache tag output from a tag way from which a cache entry is selected with a piece of tag address information TAGadrs and generate, according to a result of the comparison, hit-way discriminant signals 40a and 40b, hit signals 55a and 55b, and more-than-one-way-hit signals 56a and 56b. The discriminant circuits 53 and 54 each have the functions of the tag comparison circuit 31 and the multi-hit detection circuit 32 which have been described with reference to FIG. 3. The hit-way discriminant signals 40a and 40b cause the selectors 57a and 57b to select output data of the data way corresponding to a tag way involved in a match in case that one cache tag matches with the tag address in each of the discriminant circuits 53 and 54. The hit signals 55a and 55b are signals for showing whether or not one cache tag matches with the tag address in the respective discriminant circuits 53 and 54. The more-than-one-way-hit signals 56a and 56b are signals for showing whether or not both of cache tags match with the tag address in the discriminant circuits 53 and 54. With the parity data PRTdat made the value 0, the selector 58 selects an output of the discriminant circuit 53 on the tag way side activated thereby; with the parity data PRTdat made the value 1, the selector selects an output of the discriminant circuit 54 on the tag way side activated thereby. The logical product of the hit signal 55a or 55b selected by the selector 58 and a read-request signal RDreq is taken, which is used as a cache hit signal CHIT. The more-than-one-way-hit signal 56a or 56b selected by the selector 58 is used as the cache error signal 41. With the parity data PRTdat made the value 0, the selector 59 selects cache data selected and supplied on the side of the data ways DataWAY#0 and dataWAY#1 activated thereby; with the parity data PRTdat made the value 1, the selector selects cache data selected and supplied on the side of the data ways DataWAY#2 and dataWAY#3 activated thereby. The data selected by the selector 59 is output to the CPU2 as cache data CDAT involved in a cache hit. The flip-flop (FF) 60 latches an input signal according to the memory cycle of the way to ensure a required action timing. Incidentally, in FIG. 4, the constituents other than TagWAY#0 to TagWAY#3, and DataWAY#0 to DataWAY3 are included in the cache control circuit 10, for example.

It is noted that in FIG. 4, a data read in the event of a cache hit is shown by example as a data manipulation on a cache entry involved in the cache hit, and the diagrammatic representation of the data manipulation of write is omitted. However, it is desired to understand a write path opposite to the read path of cache data CDAT to be provided.

Figure 5:
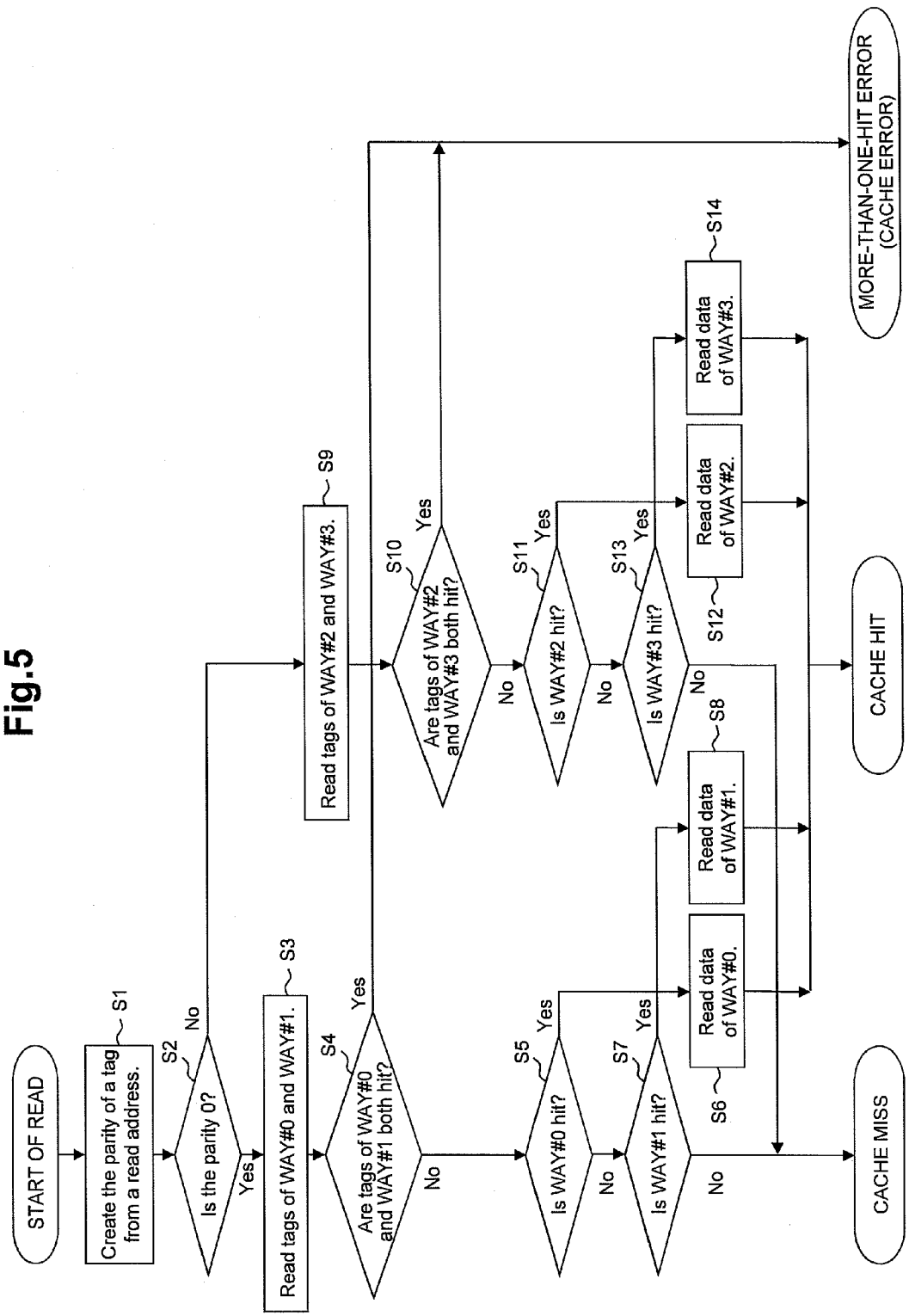
FIG. 5 It is a flow diagram showing, by example, a cache action flow of the system for a read action for a cache entry.

FIG. 5 shows, by example, a cache action flow of the system for a read action for a cache entry.

The parity data PRTdat of tag address information TAGadrs is created from access address information ACCadrs (S1). If the value of the parity data PRTdat created is 0(S2), cache tags of the tag ways TagWAY#0 and Tag-WAY#1 are read (S3). Under the condition that neither of the cache tags is hit as a result of the read (S4), if the tag way TagWAY#0 is hit (S5), a corresponding cache entry of the data way DataWAY#0 is targeted for the read or write operation (S6). If the tag way TagWAY#1 is hit (S7), a corresponding cache entry of the data way DataWAY#1 is targeted for the read or write operation (S8). In the case of the step S7 or S8, a cache miss is determined on condition that no cache hit, i.e. neither the tag way TagWAY#0 nor the tag way TagWAY#1 is hit.

In the step S2, if the value of parity data PRTdat is 1, cache tags of tag ways TagWAY#2 and TagWAY#3 are read (S9). Under the condition that neither of the cache tags is hit as a result of the read (S10), if the tag way TagWAY#2 is hit (S11), a corresponding cache entry of the data way DataWAY#2 is targeted for the read or write operation (S12). If the tag way TagWAY#3 is hit (S13), a corresponding cache entry of the data way DataWAY#3 is targeted for the read or write operation (S14). In the case of the step S12 or S14, a cache miss is determined on condition that no cache hit, i.e. neither the tag way TagWAY#2 nor the tag way TagWAY#3 is hit.

In case that both of the tag ways are hit redundantly in the step S4 or the step S10, a cache error is determined.

Figure 6:
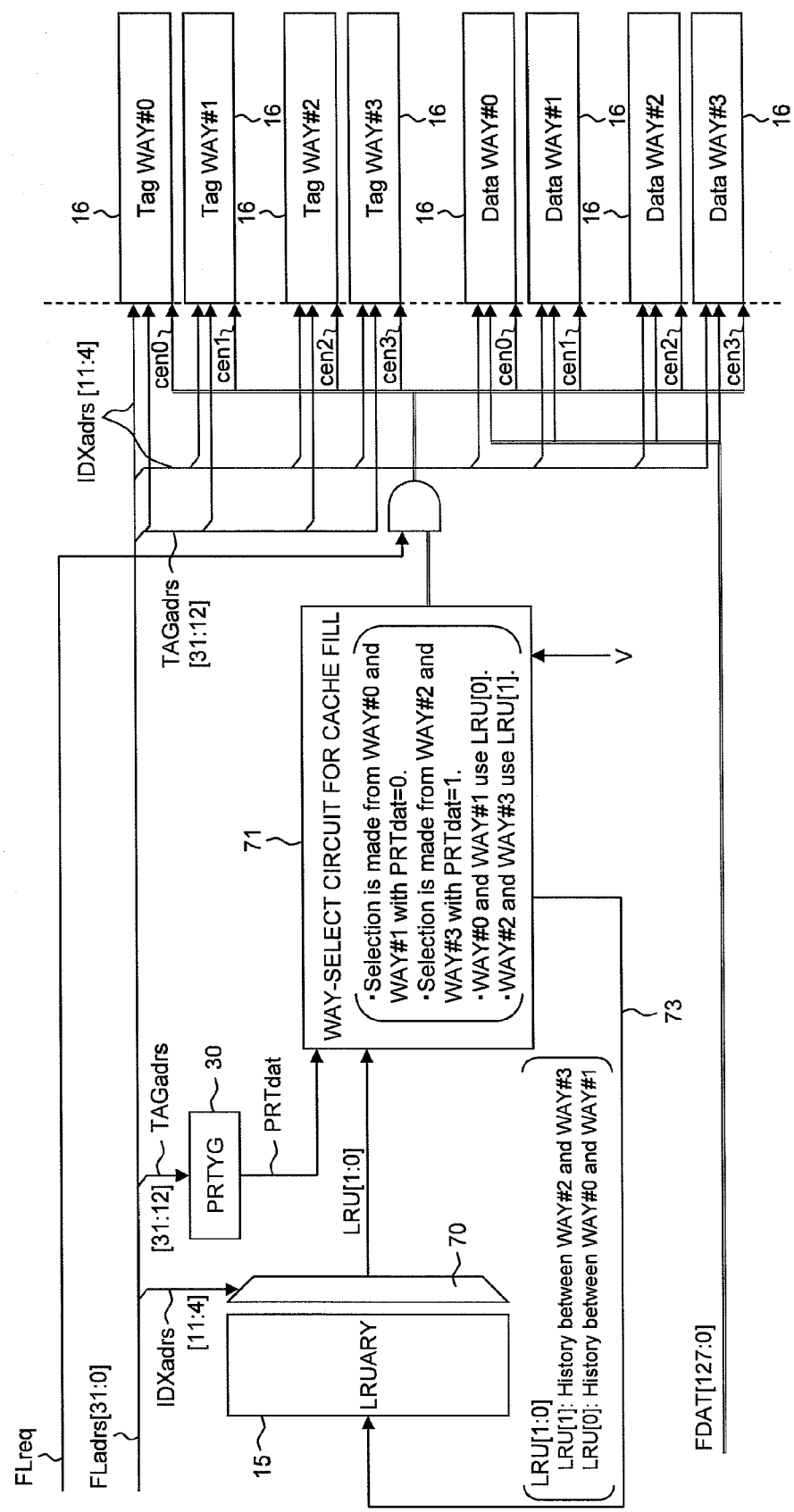
FIG. 6 It is a block diagram showing, by example, a configuration focusing on a system for a fill action which is combined with the configuration of the system for a read action of FIG. 4.

FIG. 6 shows, by example, a configuration focusing on a system for a fill action which is combined with the configuration of the system for a read action of FIG. 4. In the drawing, the configuration of the ways are the same as those in FIG. 4. When the cache memory 3 decides a cache entry to perform cache fill on, LRU data LRUdat used as an index to identify a cache entry targeted for cache fill by a pseudo LRU is stored in the LRU data array 15. The LRU data array 15 has a memory region for storing 2 bits of history data LRU[1:0] (the respective bits are denoted by LRU[0] and LRU[1]) showing a history of use in units of part of the ways selected corresponding to the value of parity data PRTdat for each index address IDXadrs on an cache entry. The history data LRU[1:0] are initialized to the logical value 0 by purge on a cache entry. The history data LRU[0] shows which way, the way #0 (the tag way TagWAY#0 and the data way DataWAY#0) or the way #1 (the tag way TagWAY#1 and the data way DataWAY#1) to use a valid cache entry of for replacement by priority. The history data LRU[1] shows which way, the way #2 (the tag way TagWAY#2 and the data way DataWAY#2) or the way #3 (the tag way TagWAY#3 and the data way DataWAY#3) to use a valid cache entry of for replacement by priority. For instance, LRU[0] stored in the LRU data array 15 corresponding to index address information is inverted to the logical value 1 when a cache entry of the way #1 corresponding to the index address information is used. Concurrently, LRU[1] is inverted to the logical value 1 when a cache entry of the way #3 corresponding to the index address information is used. It is assumed here that the bits of history data LRU[0] and LRU[1] make a way having a smaller way number a target for replacement in the case of the logical value 0, for example, and make a way having a larger way number a target for replacement in the case of the logical value 1, the corresponding history data bit is inverted and updated each time replacement is performed. Supposing the initial value of LRU[0] is the logical value 0, for example, the way #0 is used in the fill subsequent to initialization, and LRU[0] is inverted to the logical value 1. In replacement subsequent thereto, the way #1 which has not been used recently is targeted for replacement, and the LRU[0] is inverted to the logical value 0. After that LRU[0] may be subjected to a toggle operation in the same way.

What is denoted by 70 conceptually represents a select circuit which decodes a piece of index address information IDXadrs and selects corresponding history data LRU[1:0], and is described in reference to the other drawings on the assumption that the functions are included in the LRU array 15.

"71" denotes a way-select circuit for cache fill. The way-select circuit 71 generates a block-select signal for selecting a way used for cache fill based on the history data LRU[1:0] read from the LRU data array 15 by use of index address information IDXadrs, and the parity data PRTdat, and a valid bit V and the like. The block-select signal is equivalent to the block-enable signals cen0 to cen3 supplied to the memory blocks 16 respectively. The selection logic of the block-select signal is as follows.

The way-select circuit 71 refers to valid bits V of cache entries indexed from the tag ways TagWAT#0 and Tag-WAT#1 in turn if the parity data PRTdat is e.g. the logical value 0. A cache entry having an invalid valid bit V is targeted for cache fill; the way-select circuit 71 makes a corresponding block-select signal (any one of cen0 and cen1) the logical value 1 so that one tag way (any one of TagWAY#0 and TagWAY#1) which the cache entry belongs to is selected. The other three block-select signals show the logical value 0, which bring the corresponding tag ways to a non-selected state respectively. Further, the way-select circuit 71 performs a required update on the history data LRU[0] so that of the tag ways TagWAY#0 and TagWAY#1, the priority of the non-selected side way is made higher in the subsequent cache fill. On condition that the valid bits V are both valid, the way-select circuit 71 makes the block-select signal (cen0 or cen1) the logical value 1 so that one way on which priority is put by the value of the history data bit LRU[0] is selected, and targets an indexed cache entry for cache fill. The other three block-select signals bring the corresponding tag ways to the non-selected state respectively. In this case, the way-select circuit 71 performs the update so as to invert the value of the history data LRU[0]. The update of history data is performed by rewrite of the history data according to e.g. update information 73. Incidentally, the block-select signals cen0 to cen3 are supplied to the corresponding ways TagWAY#0 to TagWAY#3 and DataWAY#0 to DataWAY#3 through the AND gate 72 on condition that a cache fill request signal FLreq is activated.

256 entries×4 ways=1024 valid bits are provided corresponding to cache entries; each valid bit V shows the validity of the corresponding cache entry. The valid bits V are stored in diagrammatically unshown memory devices (flip-flops or the likes) different from the memory blocks 16. Four valid bits V (corresponding to respective cache entries belonging to four tag ways respectively) are identified from among 1024 valid bits based on an index address IDXadrs, and supplied to the way-select circuit 71. The way-select circuit 71 identifies two valid bits V to refer to based on parity data PRTdat. Reference is made to two valid bits V corresponding to TagWAY#0 and TagWAY#1 respectively on condition that the parity data PRTdat is the logical value 0; reference is made to two valid bits V corresponding to TagWAY#1 and TagWAY#2 respectively on condition that the parity data PRTdat is the logical value 1.

Figure 7:
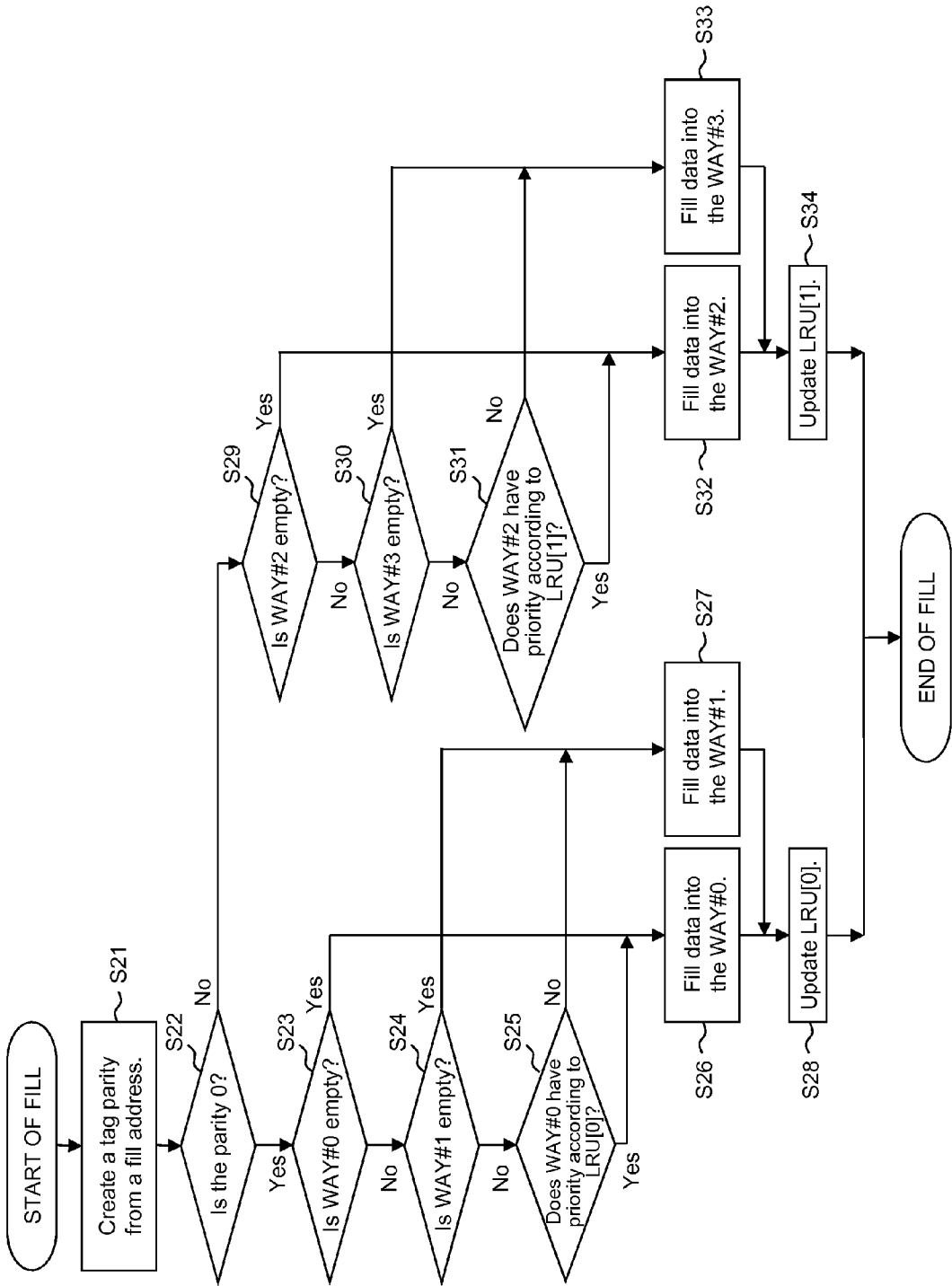
FIG. 7 It is a flow diagram showing, by example, a cache action flow of the system for a fill action on a cache entry.

FIG. 7 shows, by example, a cache action flow of the system for a fill action on a cache entry.

The parity data PRTdat of tag address information TAGadrs is created from fill address information FLadrs corresponding to access address information ACCadrs (S21). If the value of parity data PRTdat thus created is 0(S22), and the way #0 is empty (made invalid by the valid bit V) (S23), cache fill is performed on the way #0 (S26). If the way #0 is not empty and alternatively, the way #1 is empty (S24), cache fill is performed on the way #1(S27). If the way #0 and the way #1 are both valid, the priorities of the ways are determined according to the value of the history bit LRU[0] (S25). If the way #0 has priority, cache fill is performed on the way #0 (S26). If the way #1 has priority, cache fill is performed on the way #1 (S27). After the step S26 or S27, the history bit LRU[0] is updated as described above (S28).

If the value of parity data PRTdat is determined to be 1 in the step S22, and the way #2 is empty (made invalid by the valid bit V) (S29), cache fill is performed on the way #2 (S32). If the way #2 is not empty and alternatively, the way #3 is empty (S30), cache fill is performed on the way #3 (S33). If the way #2 and the way #3 are both valid, the priorities of the ways are determined according to the value of the history bit LRU[1] (S31). If the way #2 has priority, cache fill is performed on the way #2 (S32). If the way #3 has priority, cache fill is performed on the way #3 (S33). After the step S32 or S33, the history bit LRU[1] is updated as described above (S34).

According to the configuration of the above system for a cache fill action, parity data PRTdat are used in addition to the history data LRU[1:0] to order to select a cache entry to perform cache fill on. Therefore, the number of bits of history data can be reduced by the number of bits of parity data PRTdat. This contributes to the reduction in circuit scale of the LRU data array 15, and the reduction in power consumption therein.

While the configuration in connection with the system for a read action, and the configuration in connection with the system for a fill action have been described with reference to the separate drawings for the sake of convenience of description, the cache control circuit 10 has the configuration shown in FIG. 4 and the configuration shown in FIG. 6 in combination except for the tag ways TagWAY#0 to TagWAY#3 and the data ways DataWAY#0 to #3. The method for supplying block-enable signals to the tag ways TagWAY#0 to TagWAY#3 and the data ways DataWAY#0 to #3 respectively is as follows.

Taking the tag way WAY#0 as an example, an OR circuit (not shown) which performs an OR operation of the block-enable signal cen0 input to the tag way TagWAY#0 shown in FIG. 4, and the block-enable signal cen0 input to the tag way TagWAY#0 shown in FIG. 6, and supplies a result of the operation to the tag way TagWAY#0 is provided corresponding to the tag way WAY#0. The tag way TagWAY#0 receives a block-enable signal of the logical value 1 on condition that the tag way TagWAY#0 is selected in the read action and the fill action. Also, as to the data way DataWAY#0, an OR circuit (not shown) performs an OR operation of the block-enable signal cen0 input to the data way DataWAY#0 shown in FIG. 4, and the block-enable signal cen0 input to the data way DataWAY#0 shown in FIG. 6, and supplies a result of the operation to the data way DataWAY#0 is provided.

The same applies to the tag ways TagWAY#1 to 3, and the data ways DataWAY#0 to 4. OR circuits are provided corresponding to them respectively; their outputs are supplied to the tag ways TagWAY#1 to 3 and the data ways DataWAY#0 to 4 as block-enable signals cen1 to cen3.

<<4. ON/OFF of the Tag-Way-Select Function According to Parity Data>>

Next, the case of making arrangement so that the parity-check function (also referred to as "PBS", simply) described above can be selectively turned on/off will be described.

Figure 8:
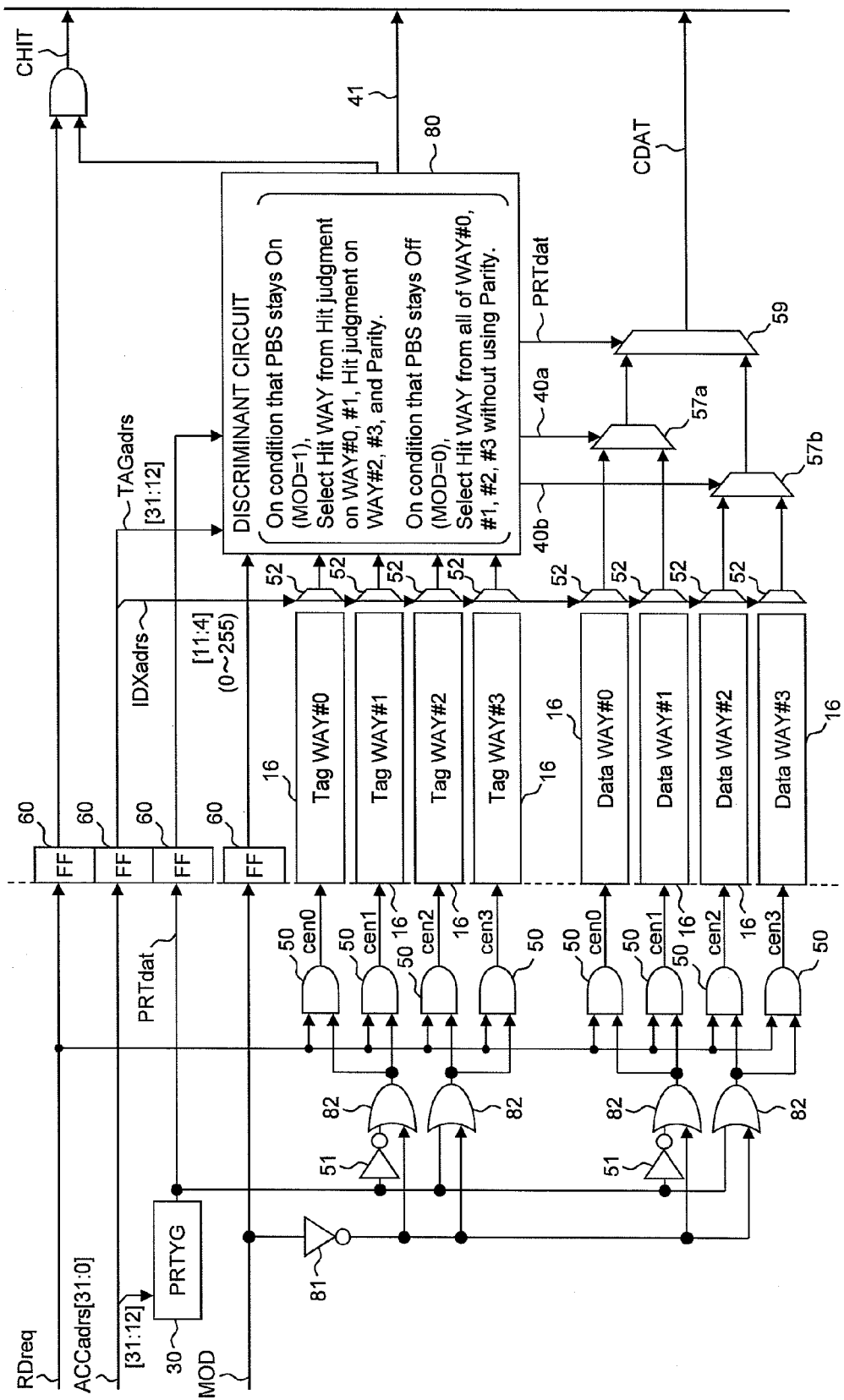
FIG. 8 It is a block diagram showing, by example, a configuration focusing on a system for a read action on a cache entry in the case of making arrangement so that the parity-check function can be selectively turned on/off.
Figure 9:
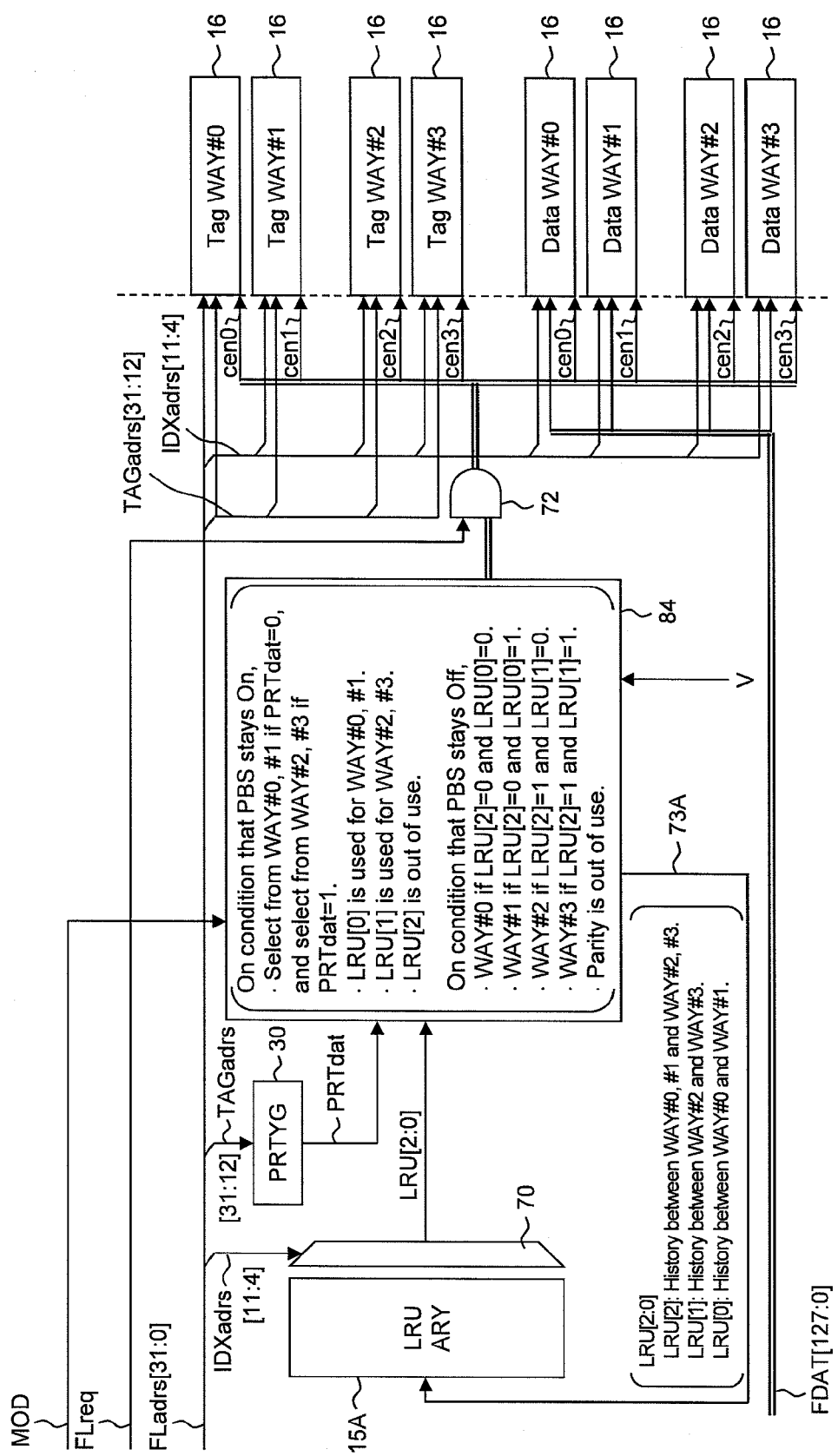
FIG. 9 It is a block diagram showing, by example, a configuration focusing on a system for a fill action on a cache entry in the case of making arrangement so that the parity-check function can be selectively turned on/off.

FIG. 8 shows, by example, a configuration focusing on a system for a read action on a cache entry in the case of making arrangement so that the parity-check function can be selectively turned on/off. It differs from FIG. 4 in the form of inputting a mode signal MOD for directing whether to select the parity-check function or not to control the activation of the ways according to a value of the mode signal MOD; the form of generating a cache hit signal CHIT, and the form of controlling the output of cache data CDAT. FIG. 9 shows, by example, a configuration focusing on a system for a fill action on a cache entry in the case of making arrangement so that the parity-check function described above can be selectively turned on/off. It differs from FIG. 6 in the function of inputting the mode signal MOD for directing whether to select the parity-check function or not to update history data according to the value of the mode signal MOD; and the function of selecting a way targeted for cache fill by a pseudo LRU using history data. The differences will be described below, wherein components having the same functions as the components in FIG. 4 and FIG. 6 have are identified by the same numerals and the detailed descriptions thereof are omitted.

In FIG. 8, the mode signal MOD having the logical value 1 directs the parity-check function to be selected, and the mode signal MOD having the logical value 0 directs the parity-check function not to be selected. To one inputs of the AND gates (see Fig. 4) which receive inverted data or non-inverted data of the parity data PRTdat, an inverted signal of the mode signal MOD is supplied through the OR gates (logical OR gates) 82. "81" denotes an inverter which inverts the mode signal MOD. Therefore, in regard to the selection on the ways #0 to #3, half of the ways are targeted for the selection according to the value of parity data PRTdat in the case of FIG. 4 when MOD=1; all the ways #0 to #3 are targeted when MOD=0.

When MOD=1, the discriminant circuit 80 which receives the mode signal MOD generates a cache hit signal CHIT and a cache error signal 41 by the same functions as those served by the discriminant circuits 53 and 54, and the select circuit 58 described with reference to FIG. 4. When the mode signal MOD=0, the discriminant circuit compares cache tags indexed by the respective tag ways TagWAY#1 to TagWAY#3 with tag address information TAGadrs to generate a cache hit signal CHIT, without using the parity data PRGTdat. In this action mode, the cache error signal 41 remains fixed at an inactive level.

In the LRU array 15A, two bits are adequate for history data because of the parity data PRTdat used in parallel as described with reference to FIG. 6 when MOD=1, whereas three bits are required when MOD=0. Since no parity data PRTdat is used, a history bit LRU[2] must be added for substitutional bits therefor. Therefore, the LRU array 15A requires a storing region of three bits of history data LRU [2:1] for each index address. The history bit LRU[0] shows priority between the way #0 and the way #1; the history bit LRU[1] shows the priority between the way #E2 and the way #3; and the history bit LRU[2] shows the priority between a combination of the ways #0 and #1, and a combination of the ways #2 and #3. The history data LRU[1:0] of two bits is significant when MOD=1, whereas the history data LRU[2:0] of three bits is significant when MOD=0.

According to this, a configuration which makes possible to make selection on whether or not to perform the parity check by a small circuit change on the configurations of FIG. 4 and FIG. 6 can be obtained because it premises the one-way and one-memory block structure. A degree of freedom can be obtained as a first mode is set by MOD=1 in case that it is desired to put priority on the parity-check function and the low power consumption, and a second mode is set by MOD=0 in case that it is desired to put priority on a high cache hit rate.

While the configuration in connection with the system for a read action, and the configuration in connection with the system for a fill action have been drawn in the separate drawings for the sake of convenience of description, the cache control circuit 10 has the configuration shown in FIG. 8 and the configuration shown in FIG. 9 in combination except for the tag ways TagWAY#0 to TagWAY#3 and the data ways DataWAY#0 to #3. The method for supplying block-enable signals to the tag ways TagWAY#0 to Tag-WAY#3 and the data ways DataWAY#0 to #3 respectively is the same as that in the cases of FIG. 4 and FIG. 6 and therefore, the description thereof is omitted.

<<5. Parity Data of More than One Bit>>

Use of parity data in the cache memory 3 of more than one bit will be described.

Figure 10:
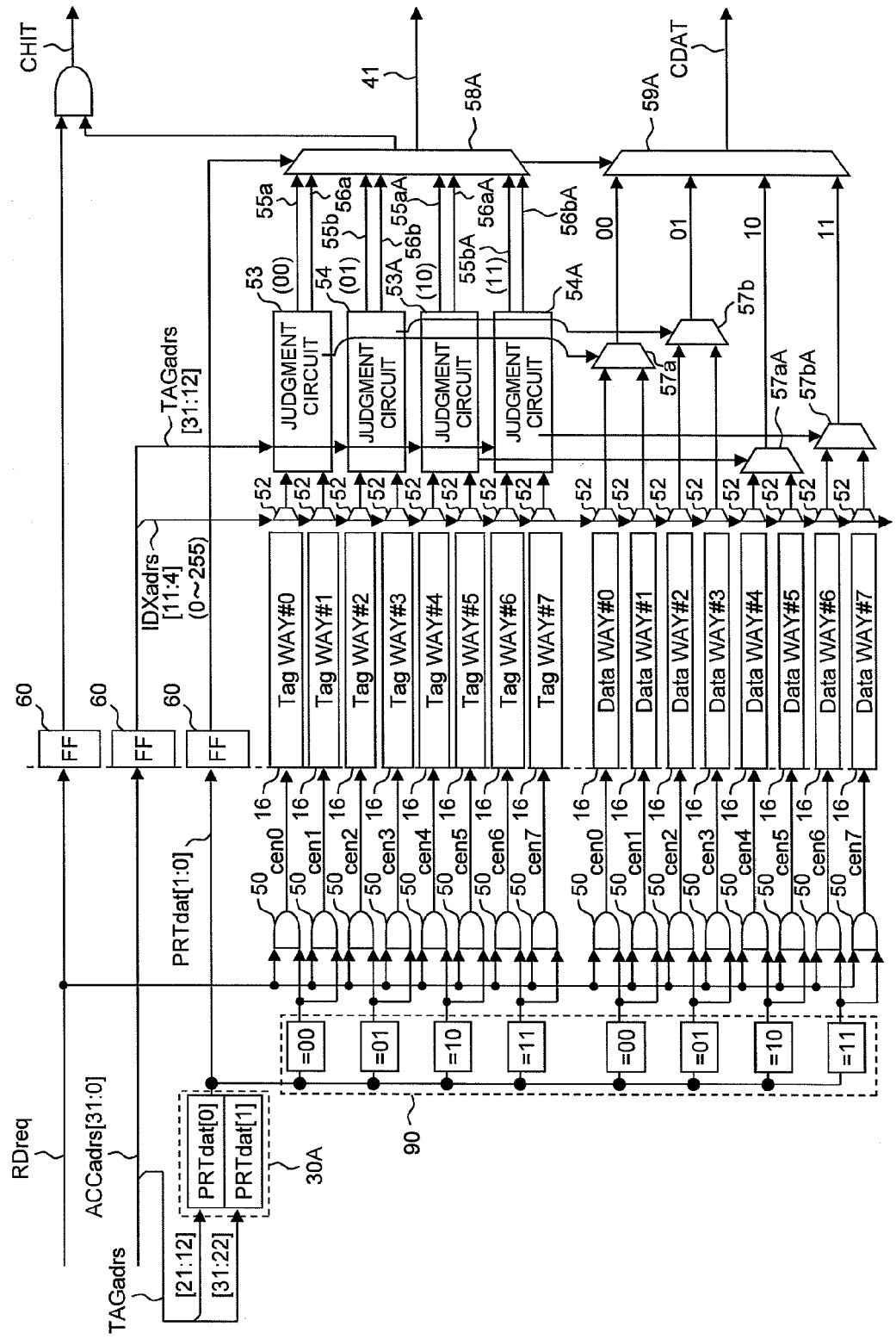
FIG. 10 It is a block diagram showing, by example, application of a configuration which uses parity data of more than one bit to the configuration of FIG. 4 focusing on a system for a read action on a cache entry.

FIG. 10 shows, by example, application of a configuration which uses parity data of more than one bit to the configuration of FIG. 4 focusing on a system for a read action on a cache entry.

In the embodiment of FIG. 4, the parity data makes one bit of parity data to all the bits of tag address information TAGadrs which is part of access address information ACCadrs; the parity data of the logical value 0 is used to select half of memory blocks 16 of all the ways, and the parity data of the logical value 1 is used to select the remaining half of the memory blocks 16 of all the ways. Thus, a power consumption required for reading a cache tag for comparison in address can be reduced by half approximately.

In contrast, in the embodiment of FIG. 10, eight ways, namely eight tag ways TagWAY#0 to TagWAY#7 and eight data ways DataWAY#0 to DataWAY#7 are constituted by memory blocks 16c respectively, and two bits of parity data PRTdat[1:0] are created and used to select the ways. The first bit (PRTdat[0]) of the parity data PRTdat[1:0] is a parity bit in connection with the low-order 10 bits of tag address information TAGadrs, and the second bit (PRTdat[1]) is a parity bit in connection with the high-order 10 bits of the tag address information TAGadrs. The parity data PRTdat[1:0] of two bits are decoded by the decoder 90. According to results of the decode, a way to be selected from a plurality of ways is decided. In FIG. 10, memory blocks 16 of the tag ways and data ways having way numbers #0 and #1 are activated when PRTdat[1:0]=00. When PRTdat[1:0]=01, memory blocks 16 of tag ways and data ways having way numbers #2 and #3 are activated. When PRTdat[1:0]=10, memory blocks 16 of tag ways and data ways having way numbers #4 and #5 are activated. When PRTdat[1:0]=11, memory blocks 16 of tag ways and data ways having way numbers #6 and #7 are activated. In other words, the number of memory blocks activated in the cache read action for comparison of tags is reduced to a quarter of the whole, whereby a lower power consumption is materialized.

Cache tags indexed by the activated tag ways TagWAY#0 to TagWAY#7 are compared with tag address information TAGadrs by the judgment circuits 53, 54, 53A or 54A in units of the ways activated according to parity data PRTdat [1:0]. The result 55a, 56a, 55b, 56b, 55aA, 56aA, 55bA or 56bA of the comparison is selected in the selector 58A according to the value of parity data PRTdat[1:0] as in the same way as described with reference to FIG. 4, whereby a cache hit signal CHIT and a cache error signal 41 are formed. In the case of a cache hit, data of a cache entry in connection with the hit is manipulated. In the case of a cache action in response to a read access shown by example in FIG. 10, if a cache hit is determined, select data in the data way in connection with the hit is selected through the select circuit 57a, 57b,57aA or 57bA, and is output as cache data CDAT.

Now, it is noted that the number of bits of the parity data PRTdat is not limited to two bits, and it may be made three or more bits by increasing the division number to tag address information on an as-needed basis.

The others are the same as those in FIG. 4 in configuration, so the detailed descriptions thereof are omitted. Although the diagrammatic representation about the configuration for cache fill is omitted, it is sufficient to select a way to be targeted for cache fill from the memory blocks of eight ways by use of parity data PRTdat[1:0] of two bits and LRU data LRU[1:0] of two bits based on the configuration of FIG. 6. While particularly not shown in the drawing, the function of selecting On/Off of PBS described with reference to FIG. 8 and FIG. 9 can be applied even to the case of using parity data PRTdat[1:0] of two bits easily.

<<6. Activation/Inactivation Control on Memory Blocks in Groups of Ways>>

Figure 11:
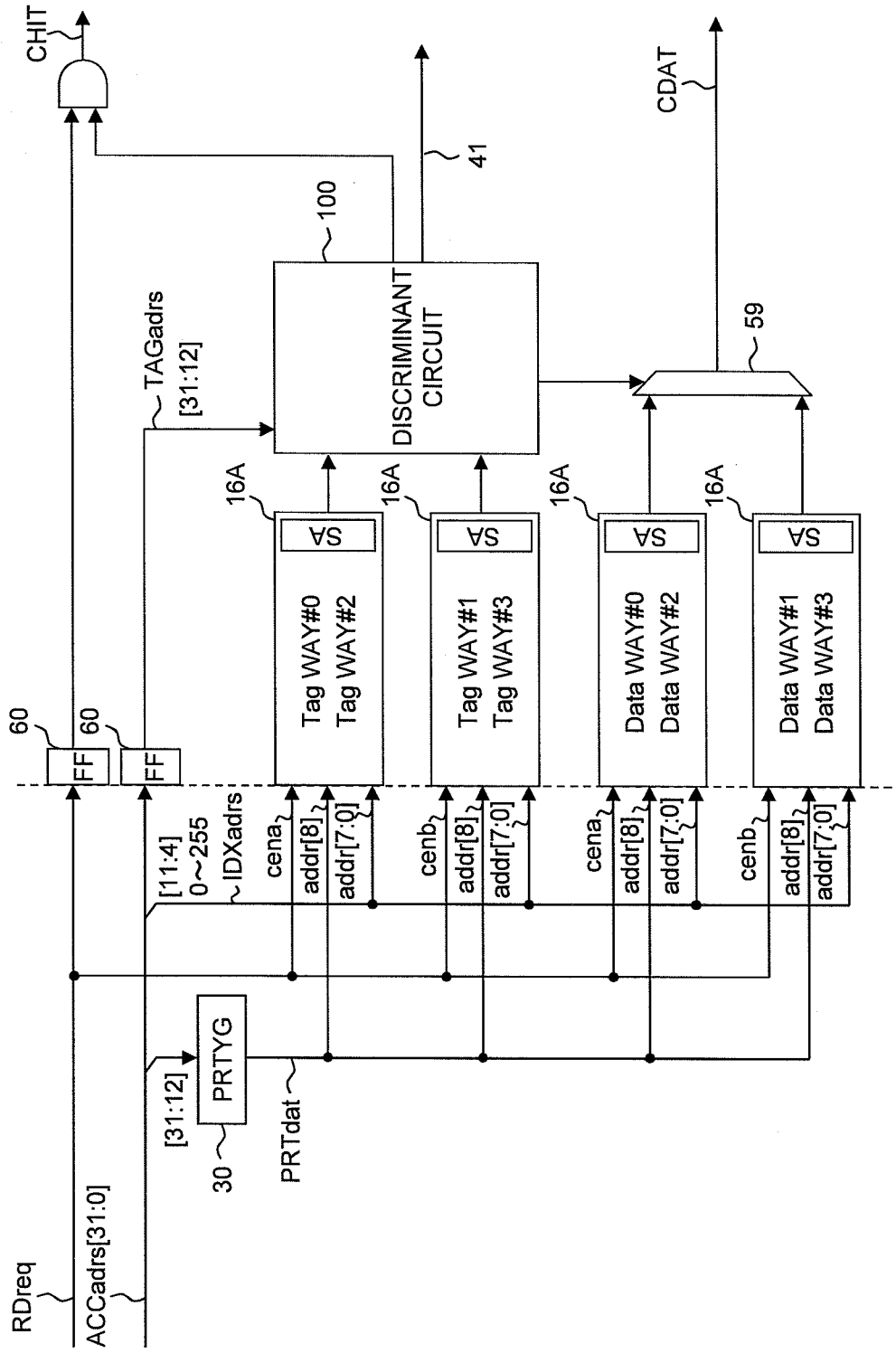
FIG. 11 It is a block diagram showing, by example, a configuration focusing on a system for a read action on a cache entry with two ways stored in each memory block.
Figure 12:
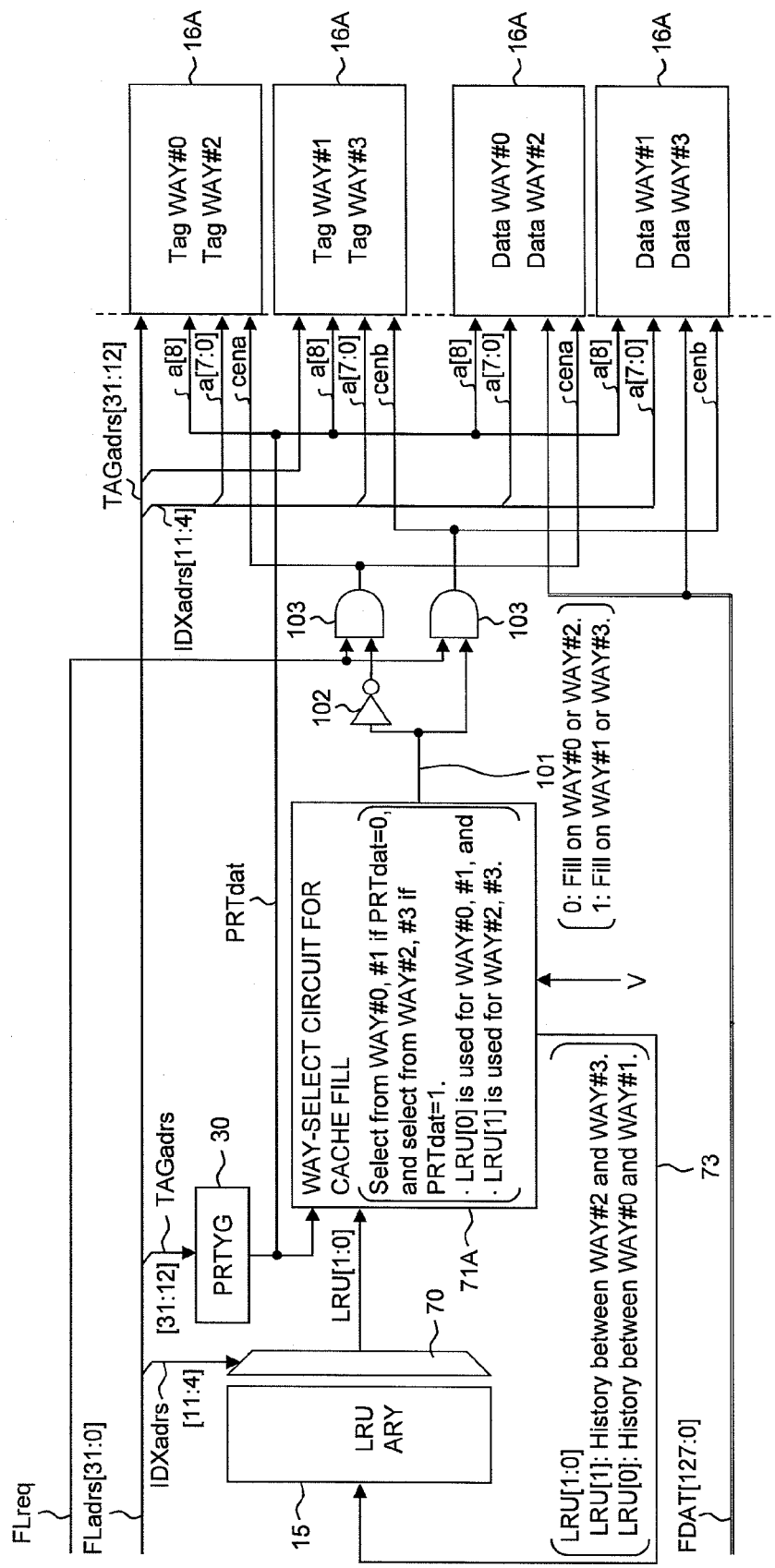
FIG. 12 It is a block diagram showing, by example, a configuration focusing on a system for a fill action on a cache entry with two ways stored in each memory block.

Next, a case in which ways are selected with more than one way stored in each memory block will be described. FIG. 11 shows, by example, a configuration focusing on a system for a read action on a cache entry with two ways stored in each memory block. FIG. 12 shows, by example, a configuration focusing on a system for a fill action on a cache entry with two ways stored in each memory block. It differs from FIG. 4 and FIG. 6 in the number of memory blocks are reduced by half, the form of controlling the selection of a cache entry targeted for the manipulation according thereto, and a circuit for discriminant control on cache tags. These differences will be described below, wherein components having the same functions as the components in FIG. 4 and FIG. 6 have are identified by the same numerals and the detailed descriptions thereof are omitted.

While a pair of ways are allocated together to and stored in one memory block 16A, the paired ways to be allocated together are selected by values of parity data PRTdat different from each other. For instance, supposing the logical value 0 of parity data PRTdat signifies that the ways of the way numbers #0 and #1 be selected, and the logical value 1 of parity data PRTdat signifies that the ways of the way numbers #2 and #3 be selected as in FIG. 4, the ways of the way numbers #0 and #2 are stored in one memory block, and the ways of the way numbers #1 and #3 are stored in one memory block, thereby avoiding selecting more than one way in one memory block. Specifically, the tag ways Tag-WAY#0 and TagWAY#2 are paired into one couple, the tag ways TagWAY#1 and TagWAY#3 are paired into one couple, the data ways DataWAY#0 and DataWAY#2 are paired into one couple, and the data ways DataWAY#1 and DataWAY#3 are paired into one couple; the couples are stored in different memory blocks 16A respectively.

To realize this, the number of entries held by one memory block 16A is made 512 entries which is double 256 in the cases of FIG. 4 and FIG. 6. In address information of 8 bits necessary for indexing them, a set of low-order bits addr[7:0] is made a piece of index address information INDadrs ([1:4]) of seven bits. The most significant bit addr[8] is used for parity data PRTdat. The parity data PRTdat which decides the most significant bit addr[8] holds a value as a select bit indicating which of a pair of ways allocated together to one memory block 16A to select. For block-enable signals cena and cenb of four memory blocks 16A, e.g. a read-request signal RDreq can be used commonly. In this case, a circuit 100 for comparing cache tags read out from two memory blocks with tag address information TAGadrs to make the determination may be arranged to have the functions of the discriminant circuits 53 and 54, and the select circuit 58 in FIG. 4.

It is sufficient that the number of sense amplifiers SA which each memory block 16A has as amplification circuits for outputting cache tag and cache data indexed by the memory block 16A is equal to the number of sense amplifiers which each memory block 16 of FIG. 4 has. In short, the total number of sense amplifiers which all the memory blocks 16A have in the configuration of FIG. 11 is approximately half of the total number of sense amplifiers which all the memory blocks 16 have in the configuration of FIG. 4. Therefore, the amount of standby current consumed by the sense amplifiers also becomes half approximately.

In the cache fill system shown in FIG. 12 by example, the way-select circuit 71A for cache fill decides the way to perform a cache fill on according to the same logic as that in the way-select circuit 71 as described for FIG. 6 based on the parity data PRTdat, LRU[1:0] and the valid bit V, in which the output select signal 101 takes the logical value 0 when the way numbered #0 or #2 is to be subjected to the fill, and takes the logical value 1 when the way numbered #1 or #3 is to be subjected to the fill. When the action of cache fill is directed by the logical value 1 of the cache fill request signal Freq, the output select signal 101 goes through the inverter 102 and the AND gate 103, thereby making block-enable signals cena and cenb of complementary levels. The block-enable signal cena is a block-enable signal to two memory blocks 16A assigned to a tag way and a data way which are numbered #0 or #2; the block-enable signal cenb is a block-enable signal to two memory blocks 16A assigned to a tag way and a data way which are numbered #1 or #3. Of the memory blocks 16A, which way to select is decided by using the parity data PRTdat of one bit as an address bit a[8] of the memory block 16A as described above. In this way, the result of way selection for cache fill by pseudo LRU is made exactly the same as that in FIG. 6. Other configurations concerning the update of history data by update information 73 on the LRU array 15, the meaning of the history data, etc. are the same as those in FIG. 6 and therefore, the detailed descriptions thereof are omitted.

The configurations of FIG. 11 and FIG. 12 can contribute to the low power consumption further in comparison to the configurations of FIG. 4 and FIG. 6 in case that standby currents of sense amplifiers, etc. are perceived as a problem further in comparison to an operating current. In other words, tag ways which are not selected concurrently are together allocated to one memory block 16A and therefore, the numbers of sense amplifiers and buffer amplifiers which one memory block 16A includes are equal to those of a memory block having one tag way approximately; a leak current such as a sub-threshold leak current in an inactivation state reduces in proportion to a decrease in the total number of memory blocks. In this regard, a lower power consumption can be achieved in some cases.

While the configuration in connection with the system for a read action, and the configuration in connection with the system for a fill action have been drawn in the separate drawings for the sake of convenience of description, the cache control circuit 10 has the configuration shown in FIG. 11 and the configuration shown in FIG. 12 in combination except for the tag ways TagWAY#0 to TagWAY#3 and the data ways DataWAY#0 to #3. The method for supplying block-enable signals to the tag ways TagWAY#0 to TagWAY#3 and the data ways DataWAY#0 to #3 respectively is the same as that in the cases of FIG. 4 and FIG. 6 and therefore, the description thereof is omitted.

It is also needless to say that the above can be applied to the case of FIG. 11 and FIG. 12 in which a way is selected with more than one way stored in each memory block, and to the configuration in which the parity bit of each of divisions of tag address information is used as described in connection with FIG. 10, which is not particularly shown in the drawing. In addition, the number of bits of parity data PRTdat is not limited to two bits, and it may be three bits or larger.

<<7. Variation of Tag Address Information>>

If address information is a physical address, tag address information is also regarded as information forming a part of the physical address information. If address information is a logical address, it is needless to say that tag address information may be regarded as information forming a part of the logical address information. However, in the case of a logical address, information ($\alpha$) required when converting the logical address into a physical address can be included. At that time, it is expedient to consider tag address information including the information $\alpha$ and as a matter of course, parity data is created on the tag address information including the information $\alpha$. For instance, in the case of performing a process by means of the multi-thread, a virtual CPU number (Virtual CPU ID) for processing each thread is the information $\alpha$. FIG. 13 shows, by example, the structure of a tag entry in that case. In FIG. 13, a tag entry has: a valid bit V showing the validity of the cache entry; a lock bit L showing whether or not the replace of the cache entry is prohibited; a Virtual CPU ID showing a virtual CPU number; and a Logical Address[31:12] showing a logical address cache tag.

Figure 14:
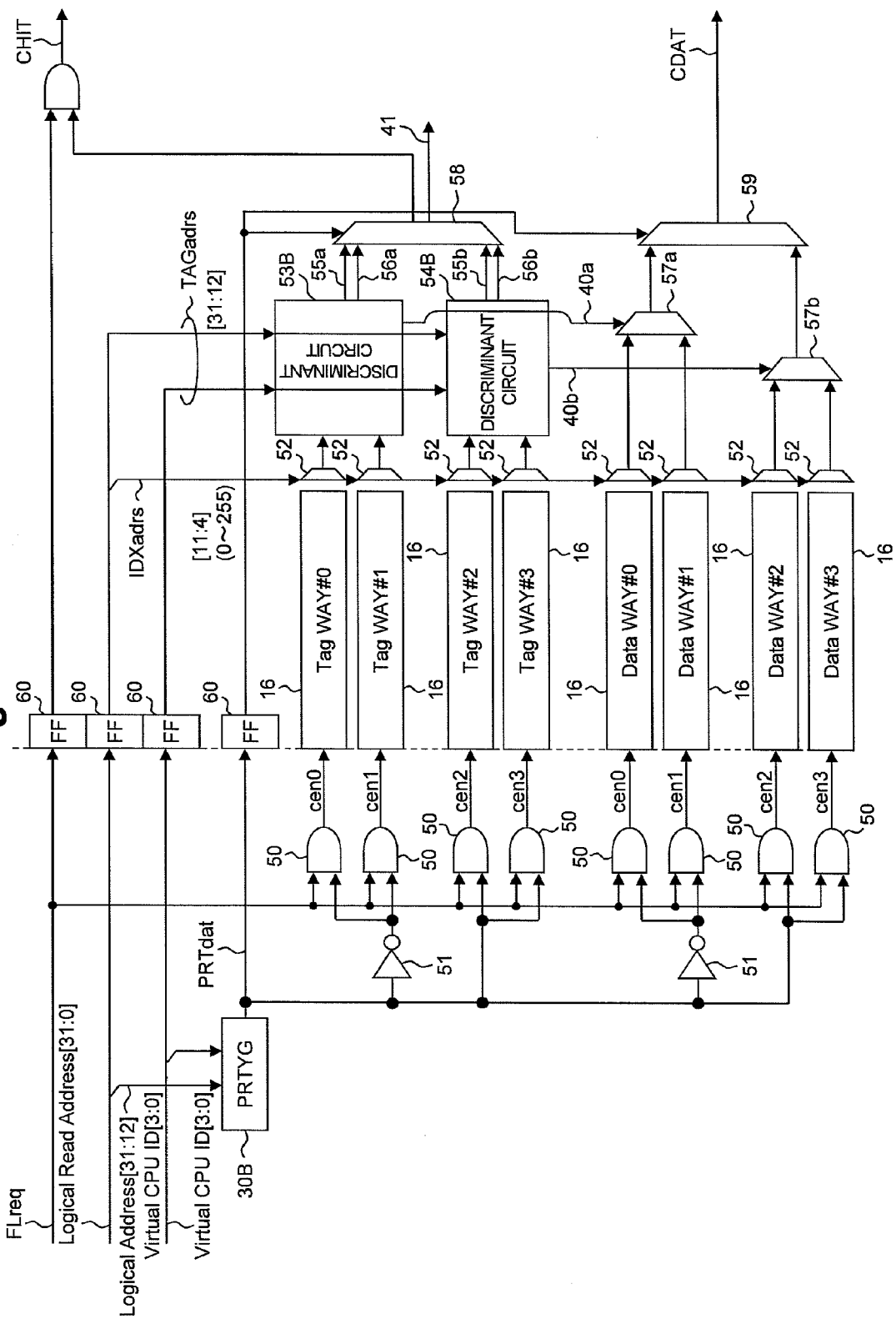
FIG. 14 It is a block diagram showing, by example, a configuration focusing on a system for a read action on a cache entry in the case of using a tag entry of FIG. 13.
Figure 15:
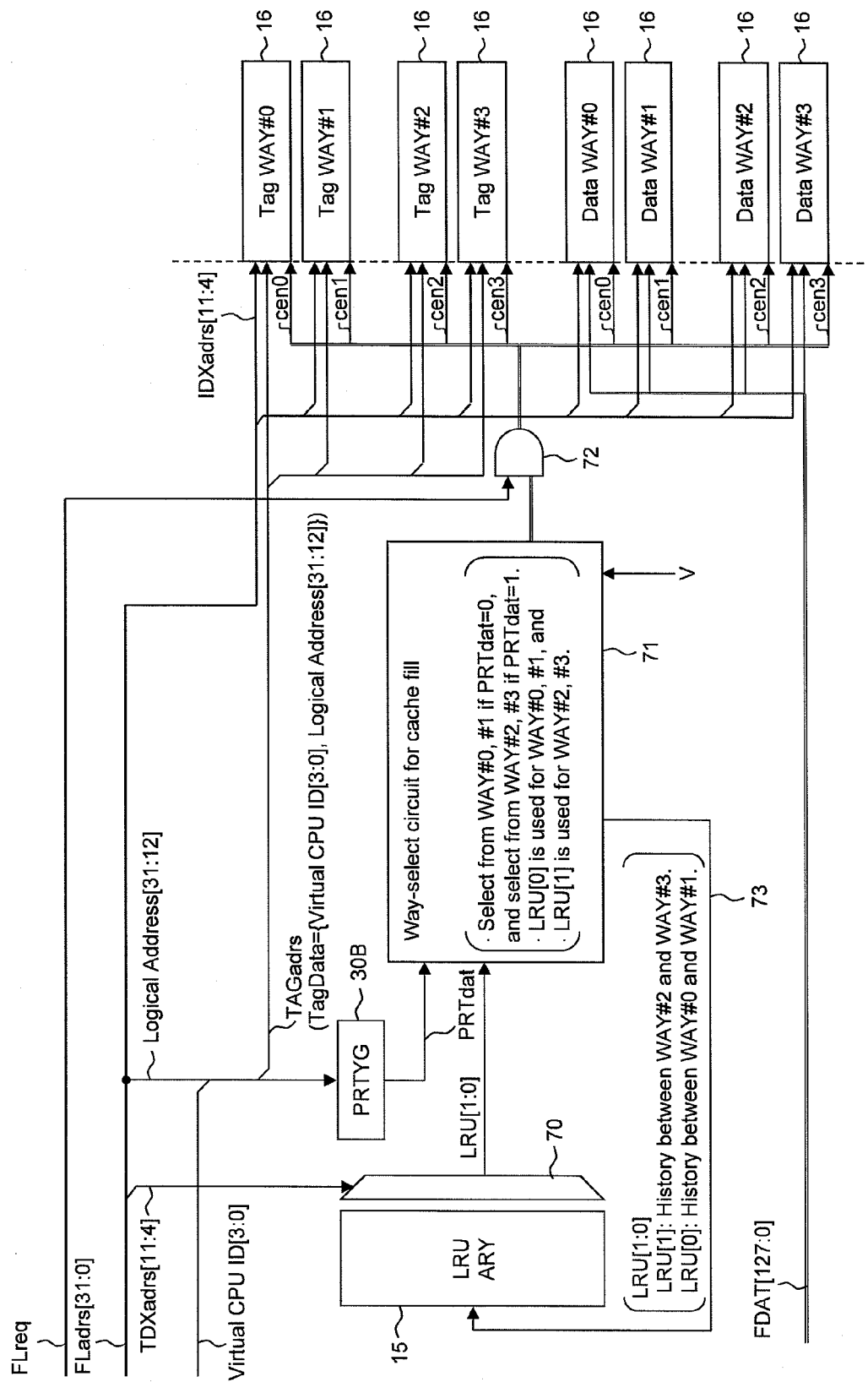
FIG. 15 It is a block diagram showing, by example, a configuration focusing on a system for a fill action on a cache entry in the case of using a tag entry of FIG. 13.

FIG. 14 shows, by example, a configuration focusing on a system for a read action on a cache entry in the case of using the tag entry of FIG. 13. The Virtual CPU ID and Logical Address[31:12] of the tag entry are stored in a tag way shown diagrammatically; the valid bit V and the lock bit L are stored in a memory device (flip-flop or the like) which is unshown diagrammatically. It differs from FIG. 4 in that the parity generation circuit 30B uses the Logical Address[31:12] and the Virtual CPU ID[3:0] to create parity data PRTdat, and the discriminant circuits 53B and 54B use the Logical Address[31:12] and the Virtual CPU ID[3:0] as tag address information TAGadrs, which is subjected to comparison with an indexed cache tag. FIG. 15 shows, by example, a configuration focusing on a system for a fill action on a cache entry in the case of using the tag entry of FIG. 13. It differs from FIG. 6 in entry information written as a cache tag is a combination of the Virtual CPU ID[3:0] and the Logical Address[31:12] corresponding to tag address information TAGadrs.

Other configurations are the same as those in FIG. 4 and FIG. 6 and as such, the detailed descriptions thereof are omitted. Also, in the case of including a Virtual CPU ID in TAGaddress information and a cache tag, it is needless to say that this configuration can be applied to the function of selecting On/Off of PBS as described with reference to FIG. 8 and FIG. 9, the arrangement of parity data consisting of more than one bit as described with reference to FIG. 10, and the collective allocation of more than one way to one memory block as described with reference to FIG. 11 and FIG. 12, and the detailed descriptions thereof are omitted.

While the configuration in connection with the system for a read action, and the configuration in connection with the system for a fill action have been drawn in the separate drawings for the sake of convenience of description, the cache control circuit 10 has the configuration shown in FIG. 13 and the configuration shown in FIG. 14 in combination except for the tag ways TagWAY#0 to TagWAY#3 and the data ways DataWAY#0 to #3. The method for supplying block-enable signals to the tag ways TagWAY#0 to TagWAY#3 and the data ways DataWAY#0 to #3 respectively is the same as that in the cases of FIG. 4 and FIG. 6 and therefore, the description thereof is omitted.

<<8. Memory Block>>

Figure 16:
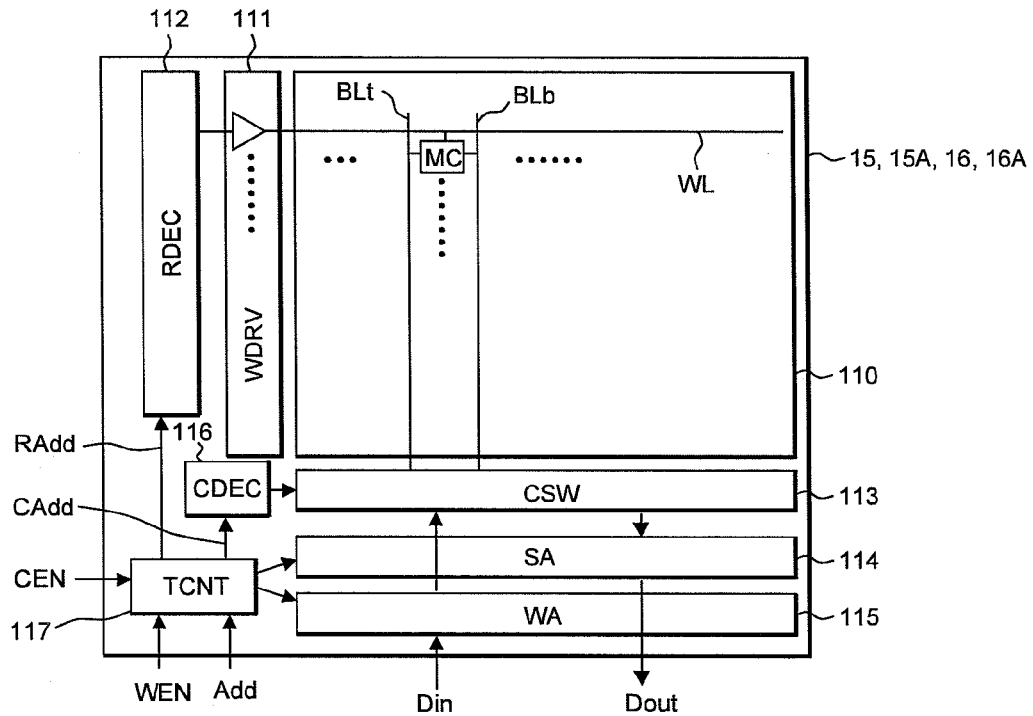
FIG. 16 It is a block diagram showing concrete examples of memory blocks 16, 16A, 15 and 15A.

FIG. 16 shows a concrete example of the memory blocks 16, 16A, 15 and 15A. The memory blocks 16, 16A, 15 and 15A are formed as e.g. static random access memories (SRAMs); in the memory array (MCA) 110, a plurality of static type memory cells MC (one memory cell is shown on behalf thereof in the drawing) are arranged like a matrix form. The terminal for selecting the memory cells is connected with a word line WL, which is shown representatively. The data input and output terminals of the memory cells are connected with complementary bit lines BLt and BLb, which are shown representatively.

The word lines WL are driven by the word driver (WDRV) 111. The row address decoder (RDEC) 112 decodes a row address signal RAdd to generate a word-line-select signal. The word driver (WDRV) 111 drives the word line WL according to a select level of the generated word-line-select signal.

The complementary bit lines BLt and BLb are selected by the column switch circuit (CSW) 113, and brought into conduction with the sense amplifier (SA) 114 or the write amplifier (WA) 115. The column-address decoder (CDEC) 116 decodes a column-address signal CAdd to generate a complementary-bit-line-select signal. The column switch circuit 113 which receives the complementary-bit-line-select signal thus generated selects the complementary bit lines BLt and BLb.

The timing controller (TCNT) 117 receives a block-enable signal CEN, a write-enable signal WEN, and an address signal Add from the outside. The block-enable signal CEN corresponds to the block-enable signal cen described above. The timing controller 117 is activated by turning the block-enable signal CEN to the select level. Specifically, the timing controller receives an address signal ADD input from the outside, supplies a row address signal RAdd to the row address decoder 112 and a column-address signal CAdd to the column-address decoder 116, and enables actions for the selections by the address decoders 111 and 116. Further, the sense amplifier 114 is activated in response to a direction for a read action by the write-enable signal WEN, whereas the write amplifier 115 is activated in response to a direction for a write action by the write-enable signal WEN.

The activated sense amplifier 114 amplifies feeble readout data transmitted from a memory cell MC to complementary bit lines BLt and BLb connected thereto through the column switch 113 to generate a data signal Dout. The activated write amplifier 115 transmits input data Din to the complementary bit lines BLt and BLb connected through the column switch 113 to write on the memory cell MC selected by the word line WL.

The numbers of bits of output data Dout and input data Din is a bit number depending on the number of bits of a tag entry in the case of a tag way, and is a bit number depending on the number of bits of a data entry in the case of a data way.

Figure 17:
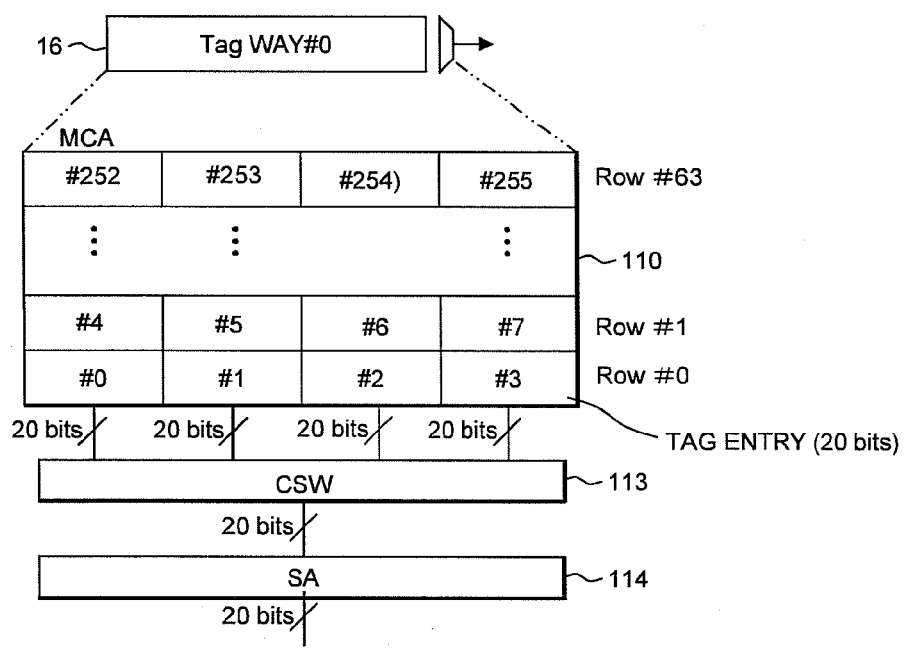
FIG. 17 It is an explanatory diagram showing, by example, the layout of tag entries of TagWAY#0 arranged by a memory block 16 which are stored in a memory cell array as an example of the tag ways.

FIG. 17 shows, by example, the layout of tag entries of TagWAY#0 arranged by a memory block 16 which are stored in the memory cell array (MCA) 110 as an example of the tag ways. The number of the tag entries is 256 in total; four tag entries are stored per row of the memory cell array; and the number of rows is 64 rows. One tag entry is made up of M bits (M is an arbitrary integer); tag address information[31:12] of 20 bits is shown by example in FIG. 17. That is, the tag ways of FIGS. 4, 6, 8, 9, 14 and 15 are typically represented in FIG. 17.

In this example, one of 256 tag entries is selected according to an address signal Add (index address information [11:4]) of 8 bits. Concretely, four tag entries on a word line are selected according to high-order 6 bits (row address) of an address signal Add; one of the four tag entries is selected by a column switch according to low-order two bits (column address); and complementary bit lines BLt and BLb of the selected tag entry is electrically coupled to the sense amplifier 114.

While particularly not shown in the drawing, the same applies to other tag ways TagWAY#1 to TagWAY#3 constituted by the memory blocks 16.

Figure 18:
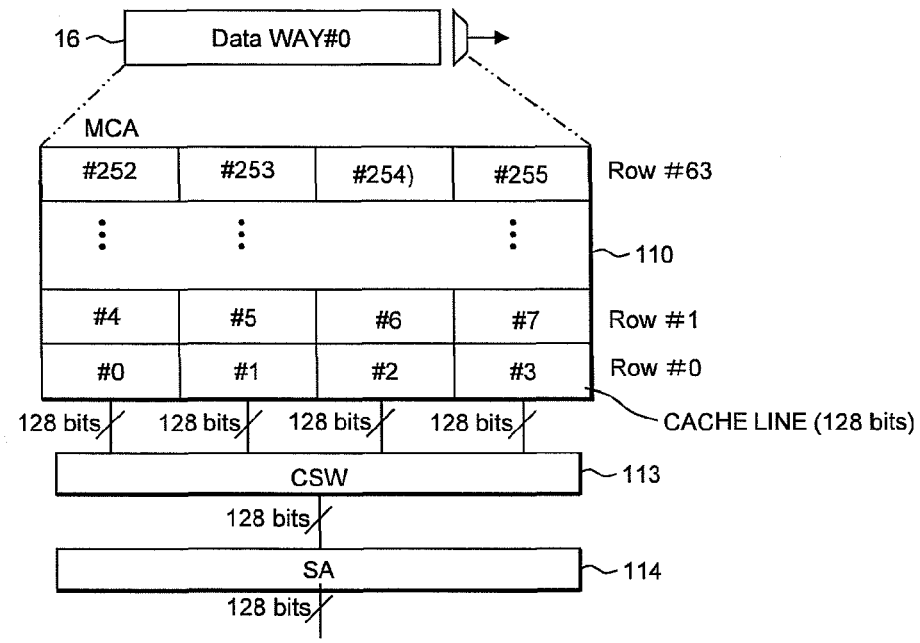
FIG. 18 It is an explanatory diagram showing, by example, the layout of data entries of DataWAY#0 arranged by a memory block 16 which are stored in the memory cell array as an example of the data ways.

FIG. 18 shows, by example, the layout of data entries of DataWAY#0 arranged by a memory block 16 which are stored in the memory cell array (MCA) 110 as an example of the data ways. The number of the data entries is 256 in total; four data entries are stored per row of the memory cell array; and the number of rows is 64 rows. One data entry, namely one line of a data way is made up of L bits. L is an arbitrary integer, and is larger than the entry size of the tag ways. The data ways of FIG. 4, FIG. 6, FIG. 8, and FIGS. 9, 14 and 15 are typically represented in FIG. 18; the entry size is made 16 bytes (L=128). In this example, one of 256 data entries is selected according to an address signal Add (index address information[11:4]) of 8 bits. Concretely, four data entries on a word line are selected according to high-order 6 bits (row address) of an address signal Add; one of the four data entries is selected by a column switch according to low-order two bits (column address); and complementary bit lines BLt and BLb of the selected data entry is electrically coupled to the sense amplifier 114.

While particularly not shown in the drawing, the same applies to other data ways DataWAY#1 to DataWAY#3 constituted by the memory blocks 16.

Figure 19:
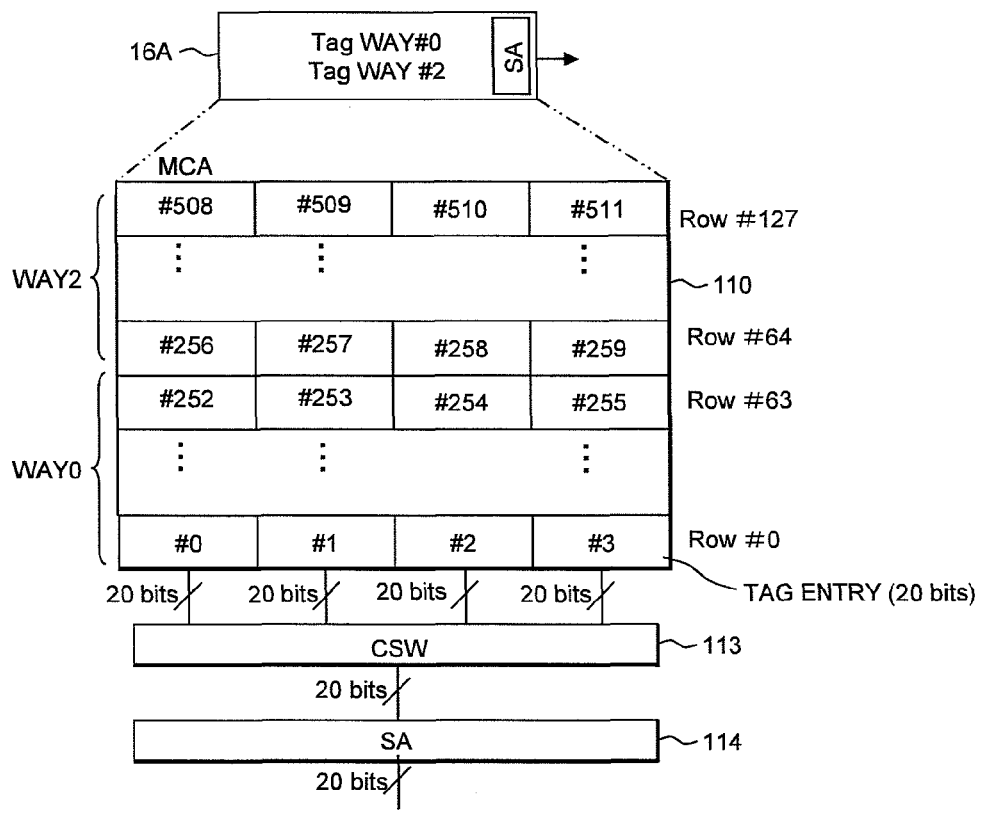
FIG. 19 It is an explanatory diagram showing, by example, the layout of tag entries of TagWAY#0 and TagWAY#2 arranged by a memory block 16A which are stored in the memory cell array as another example of the tag ways.

FIG. 19 shows, by example, the layout of tag entries of TagWAY#0 and TagWAY#2 arranged by a memory block 16A which are stored in the memory cell array (MCA) 110 as another example of the tag ways. The number of the tag entries is 512 in total; four tag entries are stored per row of the memory cell array; and the number of rows is 128 rows. One tag entry is made up of M bits (M is an arbitrary integer); and tag address information[31:12] of 20 bits is shown by example in FIG. 19. That is, the tag ways of FIGS. 11 and 12 are typically represented in FIG. 19.

In this example, one of 512 tag entries is selected according to an address signal Add (index address information [11:4]) of 8 bits and parity data PRTdat (addr[8]) of one bit.

While particularly not shown in the drawing, the same applies to other tag ways TagWAY#1 and TagWAY#3 constituted by the memory blocks 16A.

Figure 20:
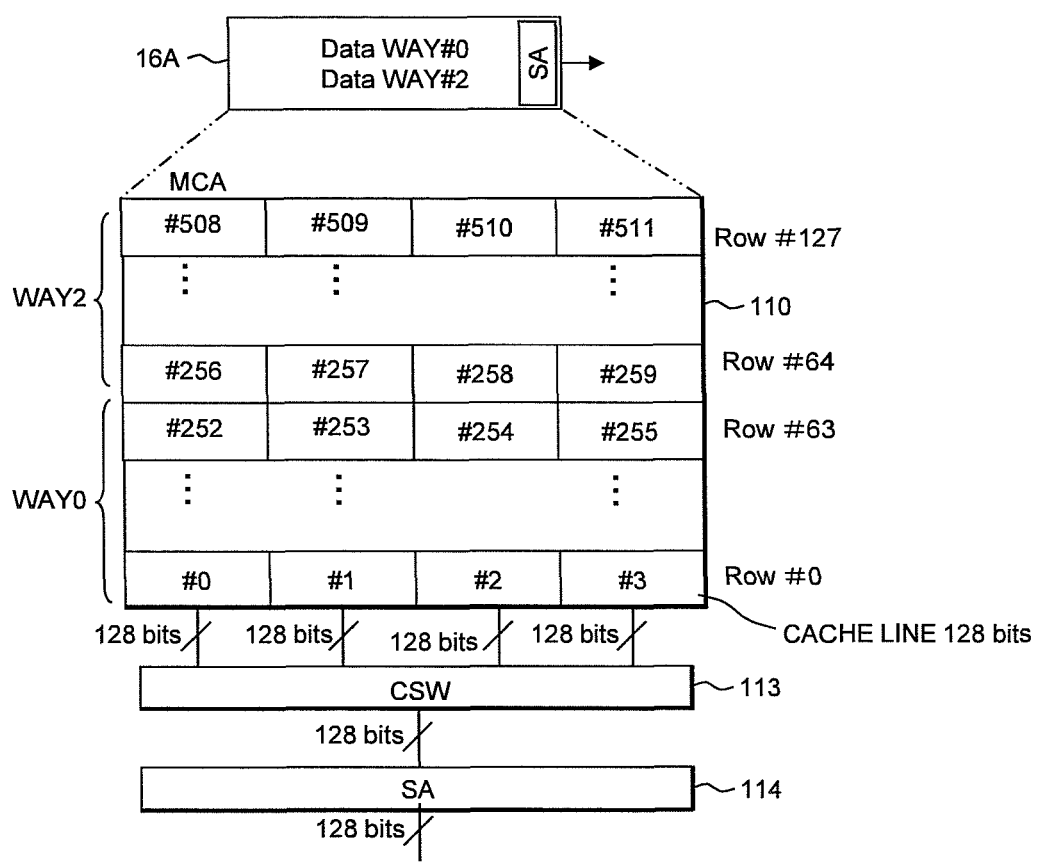
FIG. 20 It is an explanatory diagram showing, by example, the layout of data entries of DataWAY#0 and DataWAY#2 arranged by a memory block 16A which are stored in the memory cell array as an example of the data ways.

FIG. 20 shows, by example, the layout of data entries of DataWAY#0 and DataWAY#2 arranged by a memory block 16A which are stored in the memory cell array (MCA) 110 as an example of the data ways. The number of the data entries is 512 in total; four data entries are stored per row of the memory cell array; and the number of rows is 128 rows. One data entry, namely one line of a data way is made up of L bits. L is an arbitrary integer, and is larger than the entry size of the tag ways. The data ways of FIGS. 11 and 12 are typically represented in FIG. 20; the entry size is made 16 bytes (L=128).

In this example, one of 512 tag entries is selected according to an address signal Add(index address information [11:4]) of 8 bits and parity data PRTdat (addr[8]) of one bit.

While particularly not shown in the drawing, the same applies to other data ways DataWAY#1 and DataWAY#3 constituted by the memory blocks 16A.

Figure 21:
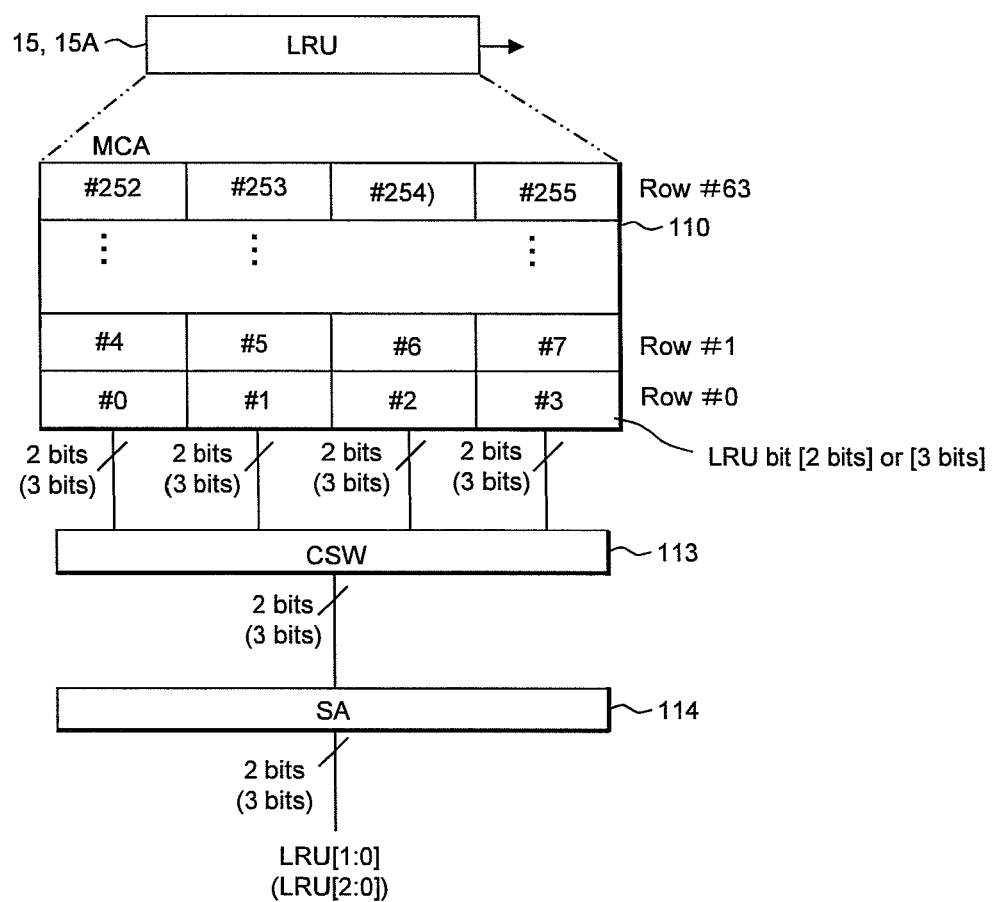
FIG. 21 It is an explanatory diagram showing, by example, the layout of LRU entries of LRU arrays 15 and 15A which are stored in the memory cell array.

FIG. 21 shows, by example, the layout of LRU entries of the LRU arrays 15 and 15A which are stored in the memory cell array (MCA) 110. The number of the LRU entries is 256 in total; four LRU entries are stored per row of the memory cell array; and the number of rows is 64 rows. One LRU entry is made up of two or three bits. The case of FIG. 9 needs three bits.

In this example, one of 256 LRU entries is selected according to an address signal Add (index address information [11:4]) of 8 bits. Concretely, four LRU entries on a word line are selected according to high-order 6 bits (row address) of an address signal Add; one of the four LRU entries is selected by a column switch according to low-order two bits (column address); and complementary bit lines BLt and BLb of the selected LRU entry is electrically coupled to the sense amplifier 114.

<<8. Summary of the Index Action on Tag Ways>>

With reference to FIG. 22, a chief embodiment of the form of an index action on tag ways is shown in summary. The action on four tag ways TagWAY#0 to TagWAY#3 is taken as an example. In the form of activating all of the memory blocks (BLCK) 16 in ways by the index action, four memory blocks 16 are accessed concurrently and as such, a power consumed thereby is the largest in comparison to that consumed the action forms below.

In the case of selecting, in a division manner, the memory blocks 16 in tag ways according to the value of parity data PRTdat as typified by FIG. 4, the number of the memory blocks 16 used for storing the tag ways TagWAY#0 to TagWAY#3 is four which is the same as the above, whereas the number of memory blocks 16 caused to work when detecting a cache hit or cache miss is two. The tag ways TagWAY#0 and TagWAY#1 are accessed concurrently when the parity data PRTdat=0, and the tag ways TagWAY#2 and TagWAY#3 are accessed concurrently when the parity data PRTdat=1. Therefore, the power consumption at that time is reduced by half approximately in comparison to the above case.

In a case in which the tag ways are allocated, in groups of two, together to and stored in memory blocks 16A, and a required tag way is selected inside thereof as typified by FIG. 11, the memory capacity per memory block 16A is double that of the memory block 16. The tag ways assigned to one memory block 16A are ones which are not selected concurrently according to the value of parity data PRTdat. That is, the tag ways TagWAY#0 and TagWAY#1 form one pair, and the tag ways TagWAY#2 and TagWAY#3 form the other pair. When the parity data PRTdat=0, the two memory blocks 16A in which the tag ways TagWAY#0 and TagWAY#2 are stored are accessed concurrently, and a required tag way is selected from one of the memory blocks. When the parity data PRTdat=1, the two memory blocks 16A in which the tag ways TagWAY#1 and TagWAY#3 are stored are accessed concurrently, and a required tag way is selected from one of the memory blocks. The number of the memory blocks caused to work is two, and the memory capacity of each memory block 16A is double that of the memory block 16. Therefore, a power consumption which is almost comparable to that in the select form of selecting the memory blocks which are in ways in the division manner is expected, a general power consumption is considered to be less than that in the select form of selecting all of the memory blocks which are in ways. The power consumption has a large influence on the action of the sense amplifiers, and especially a standby current such as a sub-threshold leak current. This is because as to the number of sense amplifiers caused to work, the number of required sense amplifiers may be equal to the number of the memory blocks 16 as long as the number of bits of a cache tag read from the way is unchanged. Moreover, the circuit scale of peripheral circuits for columns may be almost the same as that of the memory blocks 16, and the circuit scale becomes smaller. Also, in this regard, the low power consumption is materialized.

While the invention made by the inventor has been described above concretely based on the embodiments, it is not limited thereto. It is needless to say that various changes and modifications may be made without departing from the subject matter thereof.

While a case in which the tag ways and the data ways are indexed in parallel has been described, for example, the invention is not limited thereto. The select data is not limited to the parity data, and a particular bit of index address information may be used in case that the parity-check function is not required. The data configuration of a cache entry, the data configuration of a tag entry, the numbers of bits thereof, etc. can be changed appropriately. In addition, the tag address information is not limited to a pair of a virtual CPU number and a logical address of FIG. 13, and it can be appropriately changed to a pair of an address space number (ASID) and a logical address or the like according to the configuration of rows in a CPU virtual address space and the configuration of data processing threads. The microcomputer is not limited to a single CPU core, and it may be applied to a multiple CPU core. Even in such a case, the index address information may be arranged by using a virtual CPU number according to the multi-thread for each CPU core. The cache memory may be any of a command cache, a data cache and a unified cache, and it is also applicable for a primary cache and a secondary cache.

Further, arrangement is made so that parity data is created in connection with a tag address TAGadrs, and part of a plurality of tag ways, i.e. more than one tag way and data ways corresponding thereto are selected based on the parity data with other tag ways and data ways corresponding thereto remaining non-selected, low power consumption is achieved even in a case in which data for selecting a tag way is created from a tag address TAGadrs in an appropriate method. As a simple method, for example, any one bit of a total of 20 bits of a tag address TAGadrs can be used for a way-select signal.

INDUSTRIAL APPLICABILITY

The present invention can be widely applied to a semiconductor integrated circuit which performs a caching by a set associative method, a microcomputer having a primary or secondary cache, a semiconductor integrated circuit, such as a so-called SoC, System On Chip, a modularized semiconductor device, and the like.

EXPLANATION OF REFERENCE NUMERALS

1 MICROCOMPUTER (MCU)
2 CPU (Central Processing Unit)
3 CACHE MEMORY (CACHMRY)
4 INTERNAL BUS
9 INTERRUPT CONTROLLER (INTC)
5 RANDOM ACCESS MEMORY(RAM)
6 DIRECT MEMORY ACCESS CONTROLLER (DMAC)
7 FLASH MEMORY (FLASH)
8 OTHER PERIPHERAL CIRCUIT (PRPHRL)
10 CACHE CONTROL CIRCUIT (CACHCNT)
11 MEMORY MAT (MRYMAT)
12 TAG WAY (TagWAY)
13 DATA WAY (DataWAY)
14 CACHE ENTRY (CachENTRY)
15 LRU DATA ARRAY (LRUARY)
16 MEMORY BLOCK
TagWAY#0 to TagWAY#n−1 TAG WAY
ACCadrs ACCESS ADDRESS INFORMATION
TAGadrs TAG ADDRESS INFORMATION
IDXadrs INDEX ADDRESS INFORMATION
30 PARITY GENERATION CIRCUIT (PRTYG)
31 TAG COMPARISON CIRCUIT (TAGCMP)
32 MULTI-HIT DETECTION CIRCUIT (MLTHIT)
PRTdat PARITY DATA
cen0 to cen3, cena, cenb ENABLE SIGNAL (block-enable signal)

What is claimed is:

1. A data processing device comprising:
a set associative type cache memory which stores cache entries in a plurality of ways,
wherein when reading cache tags, the cache memory selects, from among the plurality of ways, part of the ways according to a value of select data created based on tag address information which is part of address information, and reads cache tags from the selected ways by use of an index address in the address information, and
when performing cache fill, the cache memory performs the cache fill on a cache entry selected from part of the ways according to the value of the select data,
wherein the cache memory has an LRU data array for storing LRU data used as an index to identify a cache entry targeted for a cache fill by a pseudo LRU when deciding a cache entry to perform cache fill on,
the LRU data array has a region for storing history data of more than one bit showing, for reach index address to a cache entry, a history of use of each group of part of the ways selected according to select data, and
the cache memory selects a cache entry to perform cache fill on based on the history data read from an LRU data array by use of index address information, and corresponding select data.

2. The data processing device according to claim 1, wherein the cache memory creates parity data in connection with tag address information which is part of the address information, and uses the parity data as the select data.

3. The data processing device according to claim 1, wherein the cache memory compares each of the cache tags read from the ways with the tag address, determines whether a result of the comparison fits All mismatched, Just one matched or More than one matched and if the determination results in More than one matched, generates a cache error signal.

4. The data processing device according to claim 3, further comprising an interrupt controller to which the cache error signal is input as a cause of exception or a cause of interrupt.

5. The data processing device according to claim 3, wherein the cache memory subjects a cache entry of a cache tag involved with the comparison result of Just one matched to data manipulation.

6. The data processing device according to claim 1, wherein the ways have tag ways for storing the cache tag corresponding to the index address and data ways for storing data corresponding to the index address,
the cache entry includes the cache tag and data corresponding thereto,
the tag ways are constituted by memory blocks whose activation or inactivation is selected from each tag way respectively, and
when reading cache tags, the cache memory selects the some tag ways by memory block activation by use of the select data.

7. The data processing device according to claim 6, wherein the select data is parity data of one bit for all of bits of tag address information which is part of the address information, and
the parity data of a first logical value is used for selecting half of the memory blocks, and the parity data of a second logical value is used for selecting the remaining half of the memory blocks.

8. The data processing device according to claim 6, wherein the select data is parity data of more than one bit composed of parity bits each consisting of a division of tag address information which is part of the address information, and
a value of the parity data decides a tag way to select from among tag ways.

9. The data processing device according to claim 6, wherein the cache memory has a first mode for selecting some tag ways from among the ways according to the select data to read a cache tag, and a second mode for making all the tag ways tag ways to read a cache tag from, and accepts input of a mode-select signal for selecting the first mode or the second mode.

10. The data processing device according to claim 1, wherein the way has a tag way for storing the cache tag corresponding to the index address and a data way for storing data corresponding to the index address,
a cache entry includes the cache tag and data corresponding thereto,
the tag ways are allocated together in groups of a given plural number to one memory block,
tag ways arranged on the same memory block are selected according to select data different from each other, and
when reading cache tags, the cache memory uses the select data and the index address information to read cache tags.

11. The data processing device according to claim 10, wherein the select data is parity data of one bit for all of bits of tag address information which is part of the address information,
the parity data of a first logical value is used to select one tag way in each of the memory blocks, and
the parity data of a second logical value is used to select the other tag way in each of the memory blocks.

12. The data processing device according to claim 10, wherein the select data is parity data of more than one bit composed of parity bits each consisting of a division of tag address information which is part of the address information, and a value of the parity data decides a tag way to select from among individual memory blocks.

13. The data processing device according to claim 1, wherein the plurality of ways are each constituted by a memory block whose activation or inactivation is selected for each tag way,
when reading cache tags, the cache memory selects the some tag ways by memory block activation by use of the select data according to the select data, and
when performing the cache fill, the cache memory selects, of cache entries indicated by the index address in each memory block, a cache entry to perform cache fill on according to the history data of more than one bit read from the LRU data array based on index address information, and the select data created based on the tag address.

14. The data processing device according to claim 1, wherein the plurality of ways are allocated together in groups of a given plural number to one memory block,
ways arranged on the same memory block are selected according to select data different from each other,
when reading cache tags, the cache memory is given a direction on which way to select in the activated memory blocks by the select data, and a direction on which cache tag to select in the directed ways by index address information in the address information, and
when performing cache fill, the cache memory is given a direction on which memory block to select by history data of more than one bit read from the LRU data array according to index address information, a direction on which way to select from the directed memory block by the select data, and a direction on which cache entry in the directed way to subject to cache fill by the index address.

15. A data processing device comprising: a set associative type cache memory which stores cache entries in a plurality of ways,
wherein when reading cache tags, the cache memory is given a direction on which part of the ways to select from the plurality of ways according to a value of parity data created based on tag address information which is part of address information, and a direction on which cache tag in the directed way to read by index address information in the address information, compares the read cache tag with the tag address, determines whether a result of the comparison fits All mismatched, Just one matched or More than one matched and if the determination results in More than one matched, generates a cache error signal, and
when performing cache fill, the cache memory performs the cache fill on a cache entry selected from part of the ways depending on a value of the select data,
wherein the cache memory has an LRU data array for storing LRU data used as an index to identify a cache entry targeted for cache fill by a pseudo LRU when deciding a cache entry to perform cache fill on,
the LRU data array has a region for storing history data of more than one bit showing, for each index address to a cache entry, a history of use of each group of part of the ways selected according to parity data, and
the cache memory selects a cache entry to perform cache fill on based on the history data read from an LRU data array by use of index address information, and corresponding parity data.

16. A data processing device comprising: a set associative type cache memory which stores entries in a plurality of ways,
wherein when reading cache tags, the cache memory is given a direction on which part of the ways to select from the the plurality of ways according to a value of parity data created based on tag address information which is part of address information, and a direction on which cache tag in the directed way to read by index address information in the address information, compares the read cache tag with the tag address, determines whether a result of the comparison fits All mismatched, Just one matched or More than one matched and if the determination results in More than one matched, generates a cache error signal,
the cache memory has an LRU data array for storing LRU data used as an index to identify a cache entry targeted for cache fill by a pseudo LRU when deciding a cache entry to perform cache fill on,
the LRU data array has a region for storing history data of more than one bit showing, for each index address to a cache entry, a history of use of each part of the ways selected according to parity data, and
the cache memory selects a cache entry to perform cache fill on based on the history data read from an LRU data array by use of index address information, and corresponding parity data.

* * * * *